(12) United States Patent
Jayaraman et al.

(10) Patent No.: US 11,574,235 B2
(45) Date of Patent: Feb. 7, 2023

(54) MACHINE LEARNING WORKER NODE ARCHITECTURE

(71) Applicant: ServiceNow, Inc., Santa Clara, CA (US)

(72) Inventors: Baskar Jayaraman, Fremont, CA (US); Aniruddha Madhusudan Thakur, Saratoga, CA (US); Tao Feng, Sunnyvale, CA (US); Kannan Govindarajan, Sunnyvale, CA (US)

(73) Assignee: ServiceNow, Inc., Santa Clara, CA (US)

( * ) Notice: Subject to any disclaimer, the term of this patent is extended or adjusted under 35 U.S.C. 154(b) by 1177 days.

(21) Appl. No.: 16/135,630

(22) Filed: Sep. 19, 2018

(65) Prior Publication Data

US 2020/0089652 A1     Mar. 19, 2020

(51) Int. Cl.
| | |
|---|---|
| *G06F 7/00* | (2006.01) |
| *G06N 20/00* | (2019.01) |
| *G06F 16/31* | (2019.01) |
| *G06F 16/33* | (2019.01) |
| *G06F 16/901* | (2019.01) |
| *G06F 40/30* | (2020.01) |
| *G06F 16/22* | (2019.01) |

(52) U.S. Cl.
CPC ......... *G06N 20/00* (2019.01); *G06F 16/2272* (2019.01); *G06F 16/316* (2019.01); *G06F 16/3347* (2019.01); *G06F 16/9017* (2019.01); *G06F 40/30* (2020.01)

(58) Field of Classification Search
CPC .............. G06F 16/2272; G06F 16/316; G06F 16/3347; G06F 16/9017

USPC ........................... 707/736, 737, 776; 706/12
See application file for complete search history.

(56) References Cited

U.S. PATENT DOCUMENTS

| | | |
|---|---|---|
| 6,609,122 B1 | 8/2003 | Ensor |
| 7,028,301 B2 | 4/2006 | Ding |
| 7,062,683 B2 | 6/2006 | Warbenburg |
| 7,131,037 B1 | 10/2006 | LeFaive |
| 7,170,864 B2 | 1/2007 | Matharu |

(Continued)

FOREIGN PATENT DOCUMENTS

CA    2903041 A1    9/2014

OTHER PUBLICATIONS

Canadian Office Action for Canadial Patent Application No. 3055826 dated Dec. 2, 2020.

(Continued)

*Primary Examiner* — Md I Uddin
(74) *Attorney, Agent, or Firm* — Fletcher Yoder PC

(57) ABSTRACT

A database contains a corpus of incident reports, a machine learning (ML) model trained to calculate paragraph vectors of the incident reports, and a look-up set table that contains a list of paragraph vectors respectively associated with sets of the incident reports. A plurality of ML worker nodes each store the look-up set table and are configured to execute the ML model. An update thread is configured to: determine that the look-up set table has expired; update the look-up set table by: (i) adding a first set of incident reports received since a most recent update of the look-up set table, and (ii) removing a second set of incident reports containing timestamps that are no longer within a sliding time window; store, in the database, the look-up set table as updated; and transmit, to the ML worker nodes, respective indications that the look-up set table has been updated.

20 Claims, 31 Drawing Sheets

(56) References Cited

U.S. PATENT DOCUMENTS

| | | |
|---|---|---|
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,239,857 B2 | 1/2016 | Trinon |
| 9,535,737 B2 | 1/2017 | Joy |
| 9,557,969 B2 | 1/2017 | Sharma |
| 9,792,387 B2 | 10/2017 | George |
| 2003/0155415 A1 | 8/2003 | Markham et al. |
| 2007/0149924 A1 | 6/2007 | Marsh |
| 2015/0324686 A1 | 11/2015 | Julian et al. |
| 2016/0132787 A1 | 5/2016 | Drevo et al. |
| 2017/0243112 A1 | 8/2017 | Ekambaram et al. |
| 2018/0248902 A1 | 8/2018 | Danila-Dumitrescu et al. |

OTHER PUBLICATIONS

Qingyao Ai, Liu Yang, Jiafeng Guo, W. Bruce Croft, Analysis of the Paragraph Vector Model for Information Retrieval, Proceedings of the 2016 ACM International Conference on the Theory of Information Retrieval, Sep. 12, 2016.

Quoc Le, Tomas Mikolov, Distributed Representations of Sentences and Documents, Proceedings of the 31st International Conference on Machine Learning, Beijing, China, 2014.

Vector Representations of Words, https://www.tensorflow.org/tutorials/word2vec (downloaded from public Internet site Jan. 21, 2018).

Tomas Mikolov, Ilya Sutskever, Kai Chen, Greg Corrado, Jeffrey Dean, Distributed Representations of Words and Phrases and their Compositionality, NIPS'13 Proceedings of the 26th International Conference on Neural Information Processing Systems, Dec. 2013.

Andrew M. Dai, Christopher Olah, Quoc V. Le, Document Embedding with Paragraph Vectors, preprint, Jul. 2015.

A Gentle Introduction to Doc2Vec, https://medium.com/scaleabout/a-gentle-introduction-to-doc2vec-db3e8c0cce5e (downloaded from public Internet site Sep. 18, 2018).

How Does Doc2Vec Represent Feature Vector of a Document?, https://www.quora.com/How-does-doc2vec-represent-feature-vector-of-a-document-Can-anyone-explain-mathematically-how-the-process-is-done (downloaded from public Internet site Sep. 18, 2018).

Wegner Lutz: "Datenbanken I", Jan. 1, 2012 (Jan. 1, 2012), XP055841559, [retrieved from internet on Sep. 16, 2021: URL:https://kobra.uni-kassel.de/bitstream/handle/123456789/2015032747855/DB_Skript.pdf?sequence=6&isAllowed=y].

European Office Action for European Patent Application No. 19198386.5 dated Oct. 13, 2021; 8 pgs.

European Search Report for European Patent Application No. 19198386.5 dated Feb. 11, 2020, 8 pgs.

Canadian Office Action for Canadial Patent Application No. 3055826 dated Sep. 22, 2021; 6 pgs.

800

| ORIGINATOR | BOB SMITH | ← 802 |
|---|---|---|
| CREATED | 2018-02-07 9:56AM | ← 804 |
| SHORT DESCRIPTION | CAN'T CONNECT TO EMAIL | ← 805 |
| PROBLEM DESCRIPTION | MY EMAIL CLIENT IS NOT DOWNLOADING NEW EMAILS. I AM CONNECTED TO THE WIRELESS NETWORK AND CAN ACCESS THE INTERNET, BUT MY CLIENT KEEPS REPORTING THAT IT IS UNABLE TO ACCESS THE SERVER. | ← 806 |
| CATEGORY | EMAIL | ← 808 |
| ASSIGNED TO | ALICE JONES | ← 810 |
| STATUS | RESOLVED | ← 812 |
| RESOLUTION | BOB'S LAPTOP WAS CONNECTED TO THE "GUEST" WIRELESS NETWORK, WHICH IS OUTSIDE OF THE FIREWALL. I TOLD HIM THAT HE COULD EITHER USE THE VPN TO ACCESS HIS EMAIL, OR CONNECT TO THE "EMPLOYEE" WIRELESS NETWORK, WHICH REQUIRES THE PASSWORD BUT IS INSIDE THE FIREWALL. | ← 814 |
| RESOLVED TIME | 2018-02-07 10:10AM | ← 816 |
| CLOSURE CODE | SOLVED (PERMANENTLY) | ← 818 |
| NOTES | THIS IS THE THIRD TIME IN A WEEK THAT I'VE HAD TO ADDRESS A SIMILAR ISSUE. CAN WE POST WIRELESS NETWORKING INSTRUCTIONS IN ALL CONFERENCE ROOMS? | ← 820 |
| LINK TO KNOWLEDGE BASE | ITKB/WIRELESS/CONFIGURATION.HTML | ← 822 |

FIG. 8

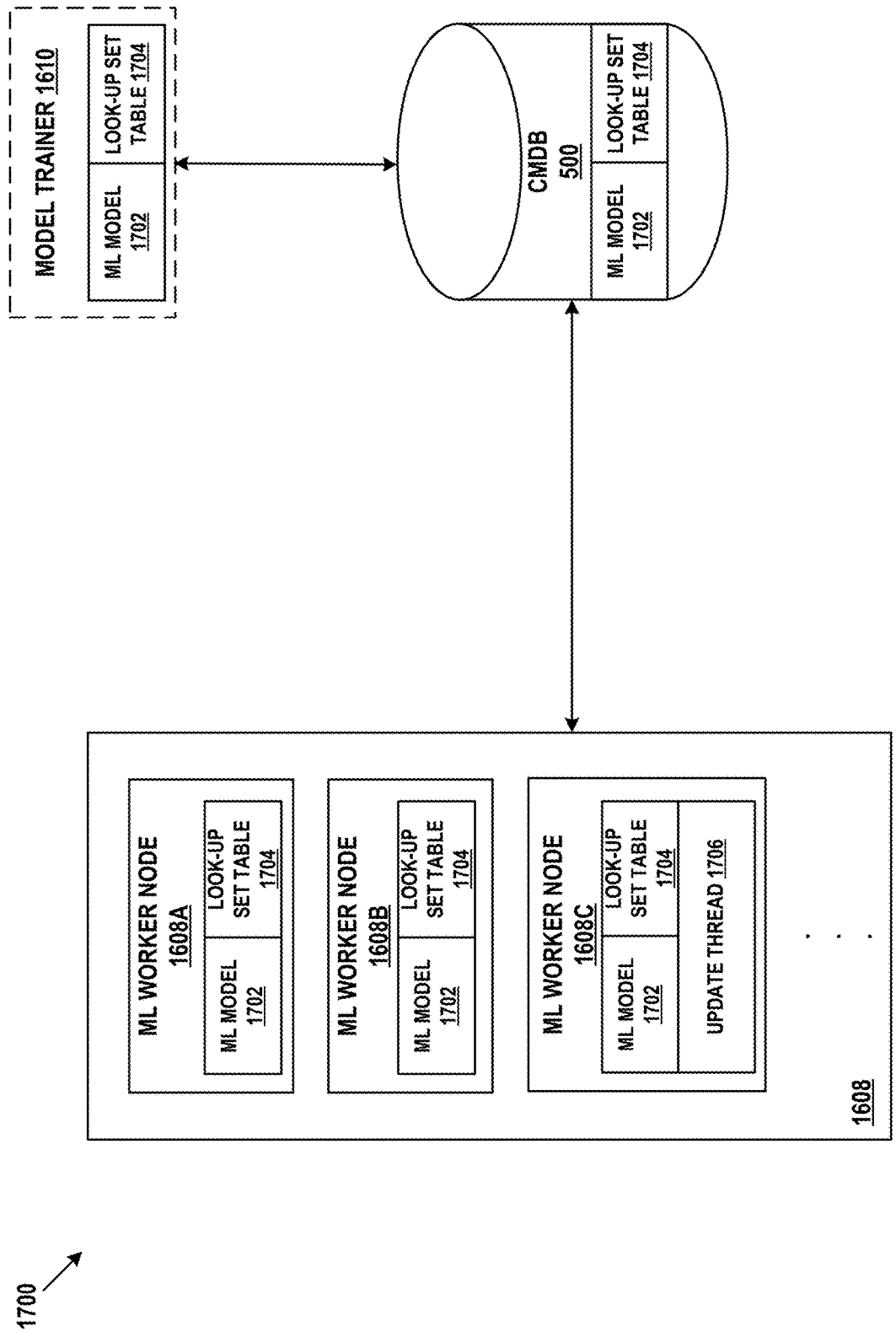

```
┌─────────────────────────────────────────────────────────────┐
│ DETERMINE, BY AN UPDATE THREAD EXECUTING ON A COMPUTING     │
│ DEVICE, THAT A LOOK-UP SET TABLE HAS EXPIRED, WHEREIN THE   │
│ LOOK-UP SET TABLE IS RELATED TO A MACHINE LEARNING (ML)     │
│ MODEL TRAINED TO CALCULATE PARAGRAPH VECTORS OF INCIDENT    │
│ REPORTS, WHEREIN THE PARAGRAPH VECTORS MAP ONE OR MORE      │ ← 1800
│ TEXT FIELDS OF THE INCIDENT REPORTS INTO A SEMANTICALLY     │
│ ENCODED VECTOR SPACE, WHEREIN THE LOOK-UP SET TABLE         │
│ CONTAINS A LIST OF PARAGRAPH VECTORS AND RESPECTIVE         │
│ ASSOCIATIONS BETWEEN EACH PARAGRAPH VECTOR IN THE LIST      │
│ AND SETS OF THE INCIDENT REPORTS, AND WHEREIN THE INCIDENT  │
│ REPORTS REFERENCED BY THE LOOK-UP SET TABLE EACH CONTAIN    │
│ A TIMESTAMP THAT IS WITHIN A SLIDING TIME WINDOW OF A       │
│ PRE-DETERMINED LENGTH                                       │
└─────────────────────────────────────────────────────────────┘
                              │
                              ▼
┌─────────────────────────────────────────────────────────────┐
│ UPDATE, BY THE UPDATE THREAD, THE LOOK-UP SET TABLE BY:     │
│ (I) ADDING A FIRST SET OF INCIDENT REPORTS RECEIVED SINCE   │
│ A MOST RECENT UPDATE OF THE LOOK-UP SET TABLE, AND          │ ← 1802
│ (II) REMOVING A SECOND SET OF INCIDENT REPORTS CONTAINING   │
│ TIMESTAMPS THAT ARE NO LONGER WITHIN THE SLIDING TIME       │
│ WINDOW                                                      │
└─────────────────────────────────────────────────────────────┘
                              │
                              ▼
┌─────────────────────────────────────────────────────────────┐
│ STORE, BY THE UPDATE THREAD AND IN A DATABASE, THE          │ ← 1804
│ LOOK-UP SET TABLE AS UPDATED                                │
└─────────────────────────────────────────────────────────────┘
                              │
                              ▼
┌─────────────────────────────────────────────────────────────┐
│ TRANSMIT, BY THE UPDATE THREAD AND TO ONE OR MORE ML        │
│ WORKER NODES, RESPECTIVE INDICATIONS THAT THE LOOK-UP SET   │
│ TABLE HAS BEEN UPDATED, WHEREIN RECEPTION OF THE            │ ← 1806
│ RESPECTIVE INDICATIONS CAUSES THE ML WORKER NODES THAT      │
│ WERE NOTIFIED TO RETRIEVE, FROM THE DATABASE, THE LOOK-UP   │
│ SET TABLE AS UPDATED                                        │
└─────────────────────────────────────────────────────────────┘
```

FIG. 18

MACHINE LEARNING WORKER NODE ARCHITECTURE

BACKGROUND

Machine learning models are being deployed to address problems experienced by enterprise networks. In particular, various types of natural language processing techniques may be applied to provide a better contextual understanding of incident reports that relate to difficulties experienced by technology users. Nonetheless, these models are complex and computationally expensive. Accordingly, there is a growing need to be able to support parallel execution of machine learning solutions, and well as to quickly and efficient update these how these models are being used.

SUMMARY

Machine learning models involving word vectors and/or paragraph vectors can enhance the contextual representation of text documents by assigning words and group of words a semantic encoding within a pre-defined vector space. Using a properly-trained model, the semantic encodings for words and paragraphs with similar meanings will be closer to one another than the semantic encodings for words and paragraphs, respectively, with less similar meanings.

Applied to new incident reports in an enterprise or other environment, these models can be used to determine previously-received incident reports that involve similar problems and that potentially have known solutions. Thus, employing the models can result in an enterprise being able to address incidents more rapidly by relying on institutional knowledge that can be mined from a database of past incident reports.

But, in an ever-changing environment, more recent instances of these past incident reports are more likely to be relevant to newly received incident reports. In particular, a problem impacting a large number of users (e.g., a network outage or a misconfigured application) may result in a sudden burst of incident reports related to this problem. Using traditional techniques, a machine learning model that was trained prior to this burst would be unable to relate new incident reports to others involving the same recent problem. Frequent re-training of the model may address this situation, but at significant computational cost.

The embodiments herein make use of a look-up set to match new incident reports to past incident reports that arrived within a sliding time window of pre-determined length (e.g., 1 day or 1 week). As the time window slides forward, this look-up set gets periodically updated to include references to recently-received incident reports, as well as to remove older incident reports that fall outside of the time window. As a consequence, recent and semantically relevant matching incidents can be found by searching within the time window.

Another improvement of the embodiments herein involve a set of machine learning worker nodes independently or semi-independently using the model and this look-up set in parallel. When the look-up set is updated, an update thread notifies the worker nodes, which then retrieve the updated look-up set. In this fashion, the use of machine learning models can be scaled up by adding more worker nodes to a system, but these nodes are readily kept up to date with information from incoming incident reports.

Accordingly, a first example embodiment may involve a database containing a corpus of incident reports, a machine learning (ML) model trained to calculate paragraph vectors of the incident reports, and a look-up set table related to the ML model, where the paragraph vectors map one or more text fields of the incident reports into a semantically encoded vector space, where the look-up set table contains a list of paragraph vectors and respective associations between each paragraph vector in the list and sets of the incident reports, and where the incident reports referenced by the look-up set table each contain a timestamp that is within a sliding time window of a pre-determined length. The first example embodiment may also involve a plurality of ML worker nodes, each storing the look-up set table and configured to execute the ML model. The first example embodiment may also involve program instructions that, when executed, are configured to cause an update thread to perform operations including: determining that the look-up set table has expired; updating the look-up set table by: (i) adding a first set of incident reports received since a most recent update of the look-up set table, and (ii) removing a second set of incident reports containing timestamps that are no longer within the sliding time window; storing, in the database, the look-up set table as updated; and transmitting, to the ML worker nodes, respective indications that the look-up set table has been updated, where reception of the respective indications causes the ML worker nodes that were notified to retrieve, from the database, the look-up set table as updated.

A second example embodiment may involve determining, by an update thread executing on a computing device, that a look-up set table has expired, where the look-up set table is related to an ML model trained to calculate paragraph vectors of incident reports, where the paragraph vectors map one or more text fields of the incident reports into a semantically encoded vector space, where the look-up set table contains a list of paragraph vectors and respective associations between each paragraph vector in the list and sets of the incident reports, and where the incident reports referenced by the look-up set table each contain a timestamp that is within a sliding time window of a pre-determined length. The second example embodiment may also involve updating, by the update thread, the look-up set table by: (i) adding a first set of incident reports received since a most recent update of the look-up set table, and (ii) removing a second set of incident reports containing timestamps that are no longer within the sliding time window. The second example embodiment may also involve storing, by the update thread and in a database, the look-up set table as updated. The second example embodiment may also involve transmitting, by the update thread and to one or more ML worker nodes, respective indications that the look-up set table has been updated, where reception of the respective indications causes the ML worker nodes that were notified to retrieve, from the database, the look-up set table as updated In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 depicts an incident report, in accordance with example embodiments.

FIG. 17A depicts sharing a machine learning model and a look-up set table between various nodes, in accordance with example embodiments.

FIG. 18 is a flow chart, in accordance with example embodiments.

DETAILED DESCRIPTION

Figure 1:
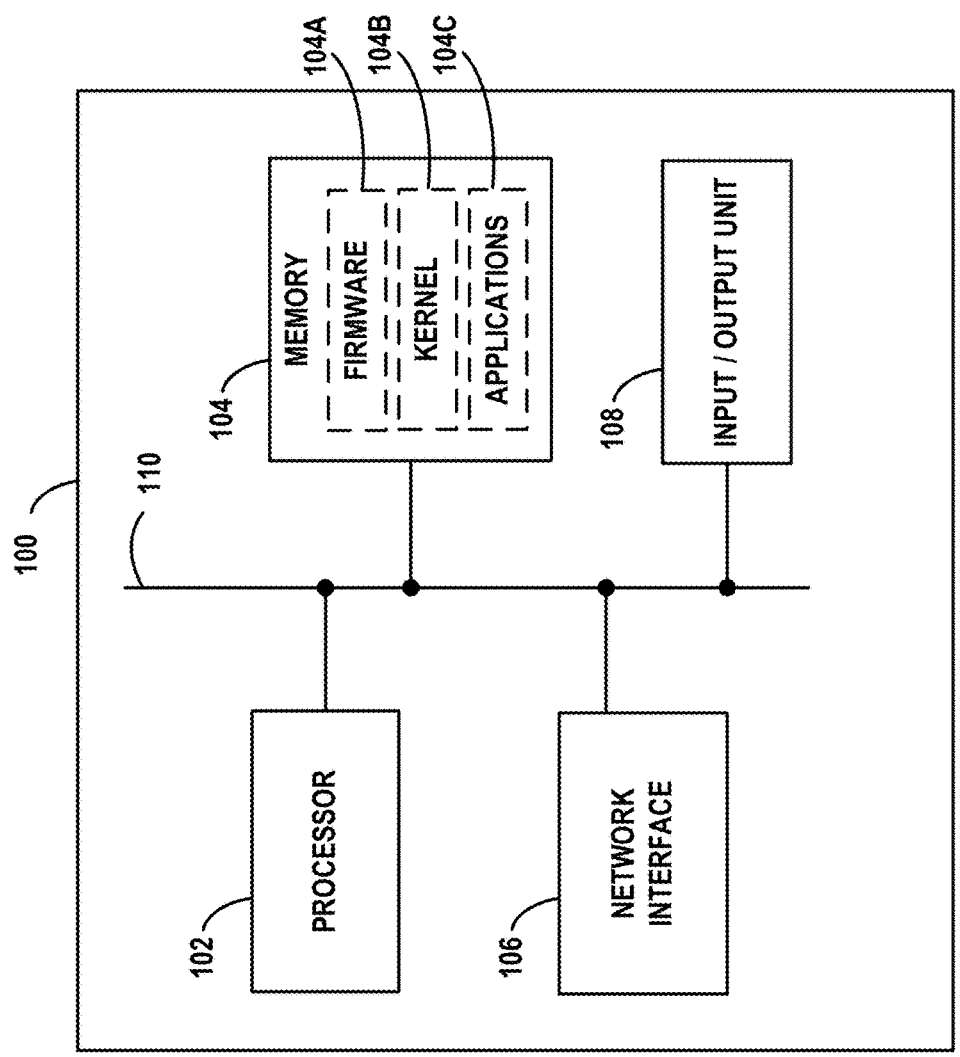
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
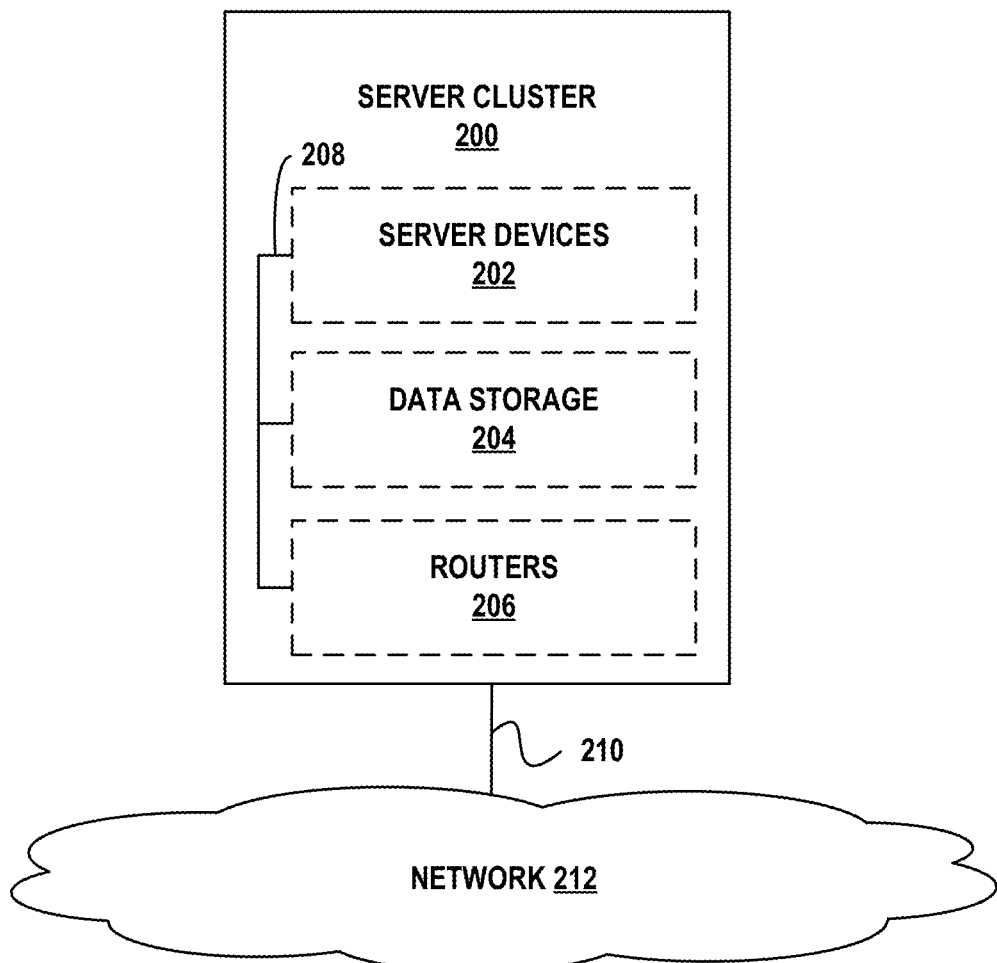
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
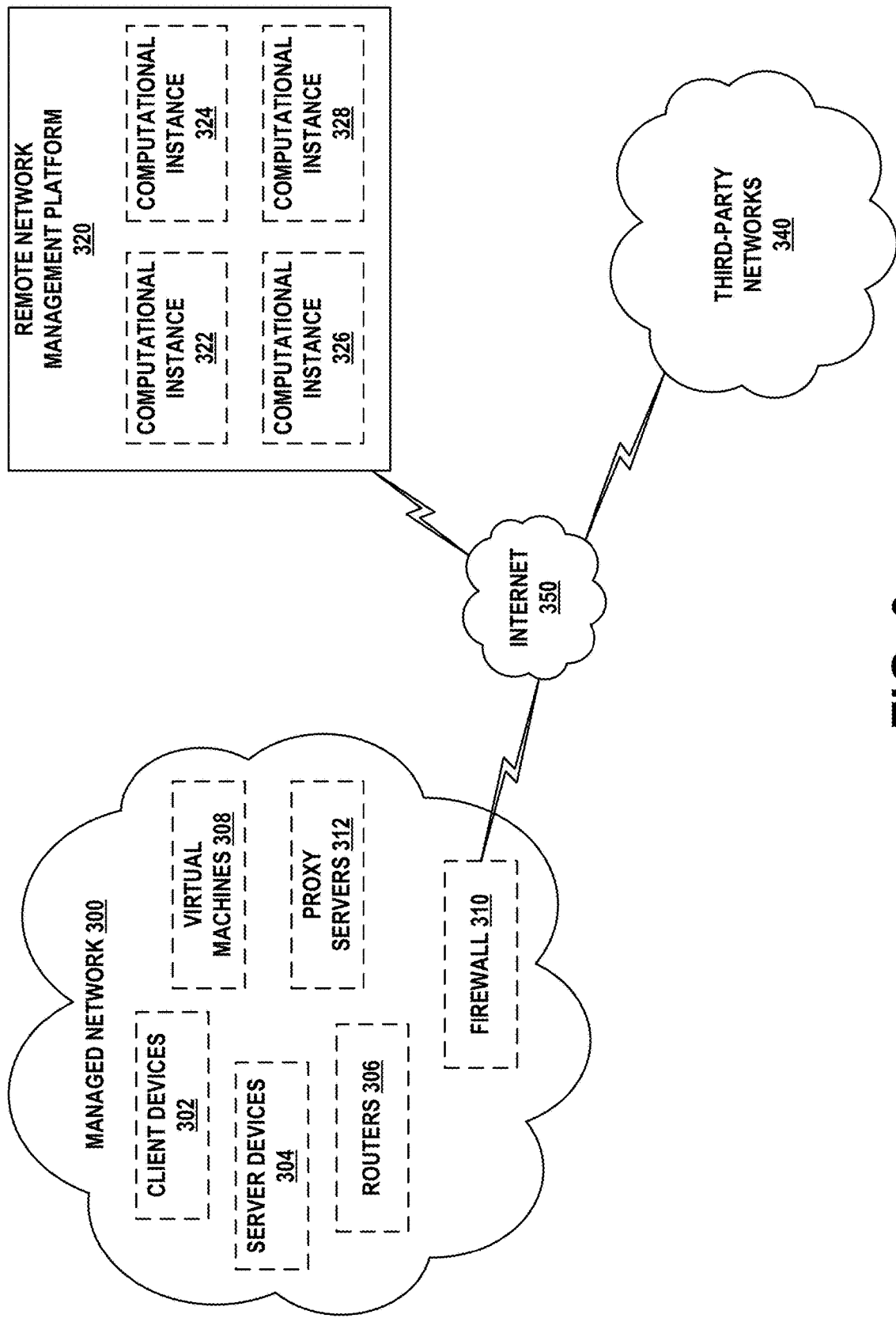
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
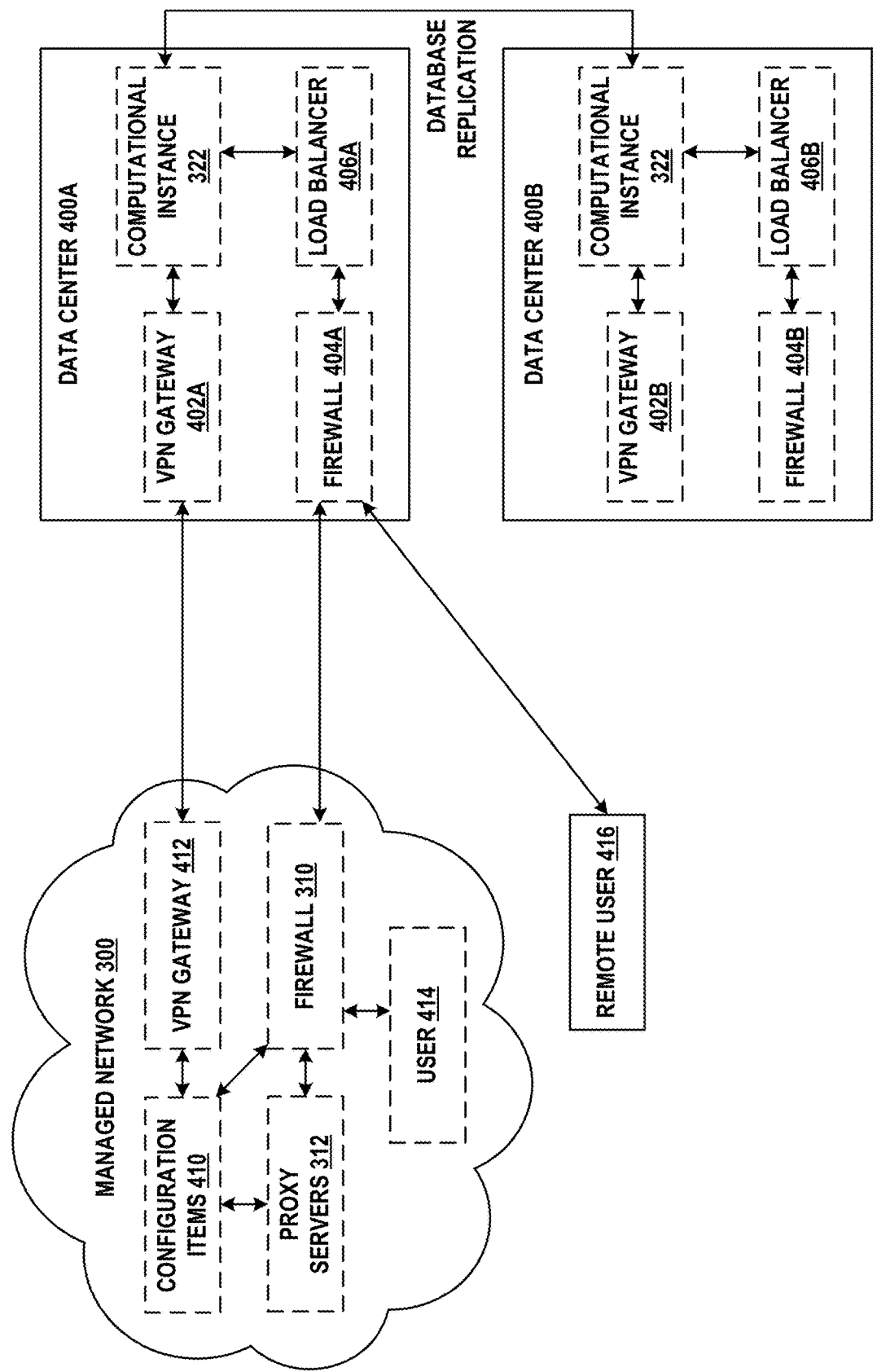
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
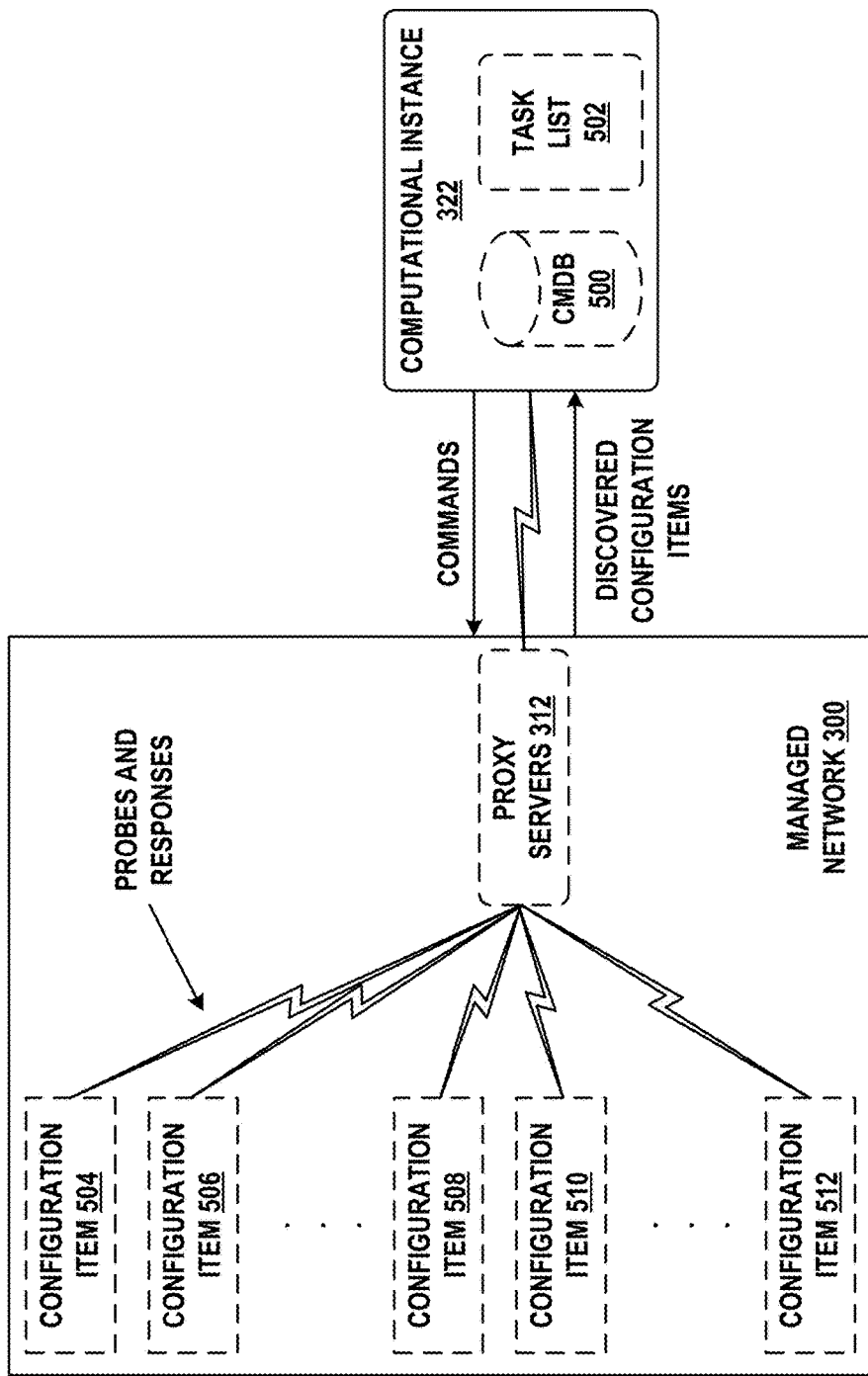
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
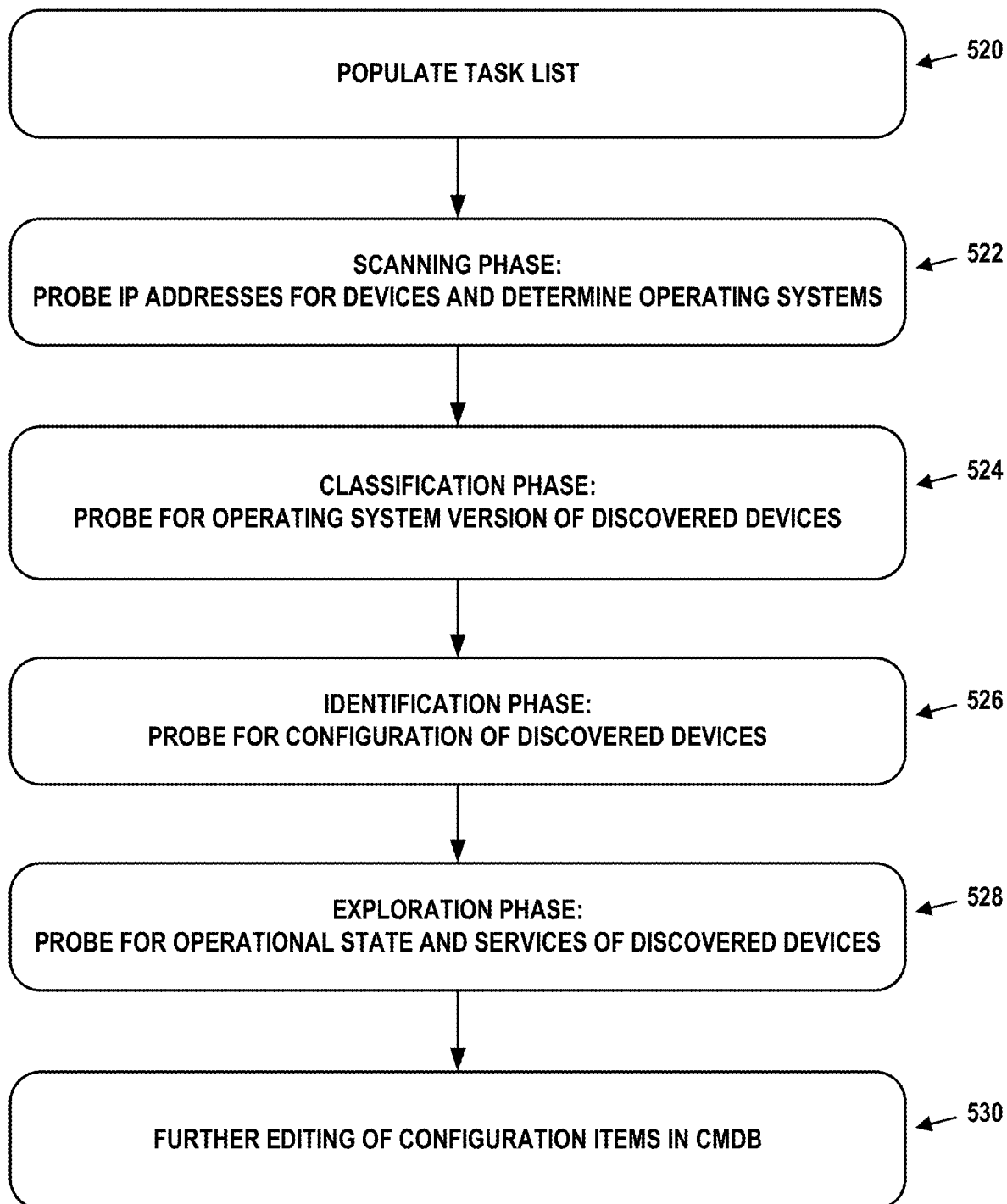
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. ARTIFICIAL NEURAL NETWORKS

In order to fully appreciate the embodiments herein, a basic background in machine learning, particularly ANNs, may be useful. An ANN is a computational model in which a number of simple units, working individually in parallel and without central control, combine to solve complex problems. While this model may resemble an animal's brain in some respects, analogies between ANNs and brains are tenuous at best. Modern ANNs have a fixed structure, use a deterministic mathematical learning process, are trained to solve one problem at a time, and are much smaller than their biological counterparts.

A. Example ANN

Figure 6:
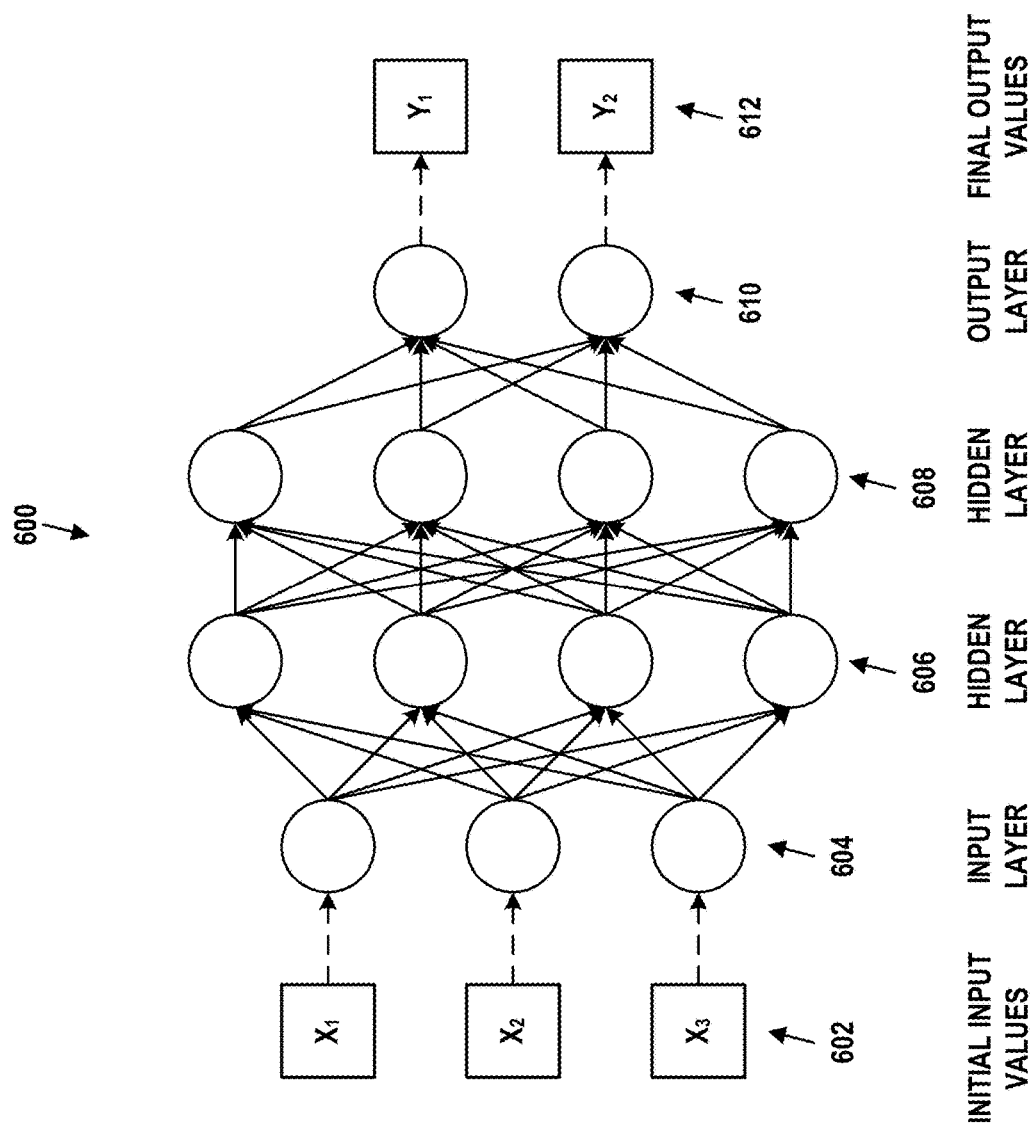
FIG. 6 depicts an ANN, in accordance with example embodiments.

An ANN is represented as a number of nodes that are arranged into a number of layers, with connections between the nodes of adjacent layers. An example ANN 600 is shown in FIG. 6. ANN 600 represents a feed-forward multilayer neural network, but similar structures and principles are used in convolutional neural networks, recurrent neural networks, and recursive neural networks, for example.

Regardless, ANN 600 consists of four layers: input layer 604, hidden layer 606, hidden layer 608, and output layer 610. The three nodes of input layer 604 respectively receive $X_1$, $X_2$, and $X_3$ from initial input values 602. The two nodes of output layer 610 respectively produce $Y_1$ and $Y_2$ for final output values 612. ANN 600 is a fully-connected network, in that nodes of each layer aside from input layer 604 receive input from all nodes in the previous layer.

The solid arrows between pairs of nodes represent connections through which intermediate values flow, and are each associated with a respective weight (e.g., any real number) that is applied to the respective intermediate value. Each node performs an operation on its input values and their associated weights to produce an output value. In some cases this operation may involve a dot-product sum of the products of each input value and associated weight. An activation function may be applied to the result of the dot-product sum to produce the output value. Other operations are possible.

For example, if a node receives input values $\{x_1, x_2, \ldots, x_n\}$ on n connections with respective weights of $\{w_1, w_2, \ldots, w_n\}$, the dot-product sum d may be determined as:

$$d = \sum_{i=1}^{n} x_i w_i + b \tag{1}$$

Where b is a node-specific or layer-specific bias.

Notably, the fully-connected nature of ANN 600 can be used to effectively represent a partially-connected ANN by giving one or more weights a value of 0. Similarly, the bias can also be set to 0 to eliminate the b term.

An activation function, such as the logistic function, may be used to map d to an output value z that is between 0 and 1, inclusive:

$$z = \frac{1}{1 + e^{-d}} \tag{2}$$

Functions other than the logistic function, such as the sigmoid or tanh functions, may be used instead.

Then, z may be used on each of the node's output connections, and will be modified by the respective weights thereof. Particularly, in ANN 600, input values and weights are applied to the nodes of each layer, from left to right until final output values 612 are produced. If ANN 600 has been fully trained, final output values 612 are a proposed solution to the problem that ANN 600 has been trained to solve. In order to obtain a meaningful, useful, and reasonably accurate solution, ANN 600 requires at least some extent of training.

B. Training

Training an ANN usually involves providing the ANN with some form of supervisory training data, namely sets of input values and desired, or ground truth, output values. For ANN 600, this training data may include m sets of input values paired with output values. More formally, the training data may be represented as:

$$\{X_{1,i}, X_{2,i}, X_{3,i}, Y^*_{1,i}, Y^*_{2,i}\} \tag{3}$$

Where $i=1 \ldots m$, and $Y^*_{1,i}$ and $Y^*_{2,i}$ are the desired output values for the input values of $X_{1,i}$, $X_{2,i}$, and $X_{3,i}$.

The training process involves applying the input values from such a set to ANN 600 and producing associated output values. A loss function is used to evaluate the error between the produced output values and the ground truth output values. This loss function may be a sum of absolute differences, mean squared error, or some other metric with positive value. In some cases, error values are determined for all of the m sets, and the error function involves calculating an aggregate (e.g., a sum or an average) of these values.

Once the error is determined, the weights on the connections are updated in an attempt to reduce the error. In simple terms, this update process should reward "good" weights and penalize "bad" weights. Thus, the updating should distribute the "blame" for the error through ANN 600 in a fashion that results in a lower error for future iterations of the training data.

The training process continues applying the training data to ANN 600 until the weights converge. Convergence occurs, for example, when the error is less than a threshold value, the change in the error is sufficiently small between consecutive iterations of training, a pre-determined maximum number of iterations is reached, or a pre-determined maximum amount of time has passed. At this point, ANN 600 is said to be "trained" and can be applied to new sets of input values in order to predict output values that are unknown.

Most training techniques for ANNs make use of some form of backpropagation. Backpropagation distributes the error one layer at a time, from right to left, through ANN 600. Thus, the weights of the connections between hidden layer 608 and output layer 610 are updated first, the weights of the connections between hidden layer 606 and hidden layer 608 are updated second, and so on. This updating is based on the derivative of the activation function.

Figure 7A:
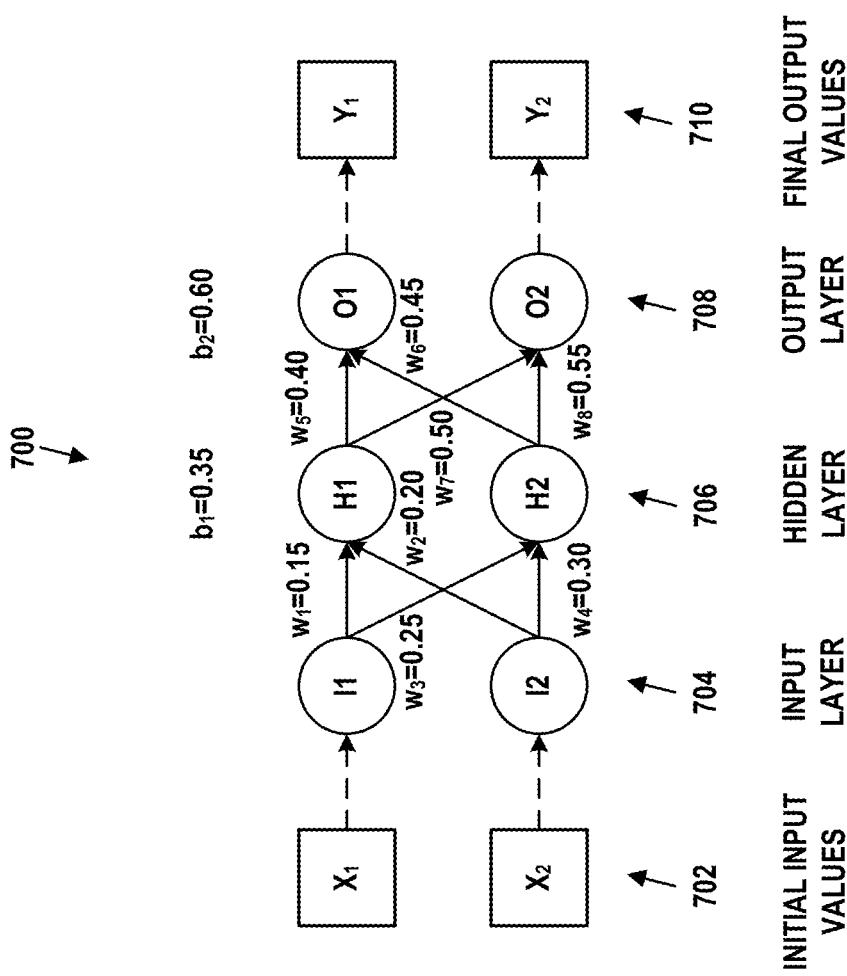
FIG. 7A depicts an ANN in the process of being trained, in accordance with example embodiments.

In order to further explain error determination and backpropagation, it is helpful to look at an example of the process in action. However, backpropagation becomes quite complex to represent except on the simplest of ANNs. Therefore, FIG. 7A introduces a very simple ANN 700 in order to provide an illustrative example of backpropagation.

ANN 700 consists of three layers, input layer 704, hidden layer 706, and output layer 708, each having two nodes. Initial input values 702 are provided to input layer 704, and output layer 708 produces final output values 710. Weights have been assigned to each of the connections. Also, bias $b_1=0.35$ is applied to the net input of each node in hidden layer 706, and a bias $b_2=0.60$ is applied to the net input of each node in output layer 708. For clarity, Table 1 maps weights to pair of nodes with connections to which these weights apply. As an example, $w_2$ is applied to the connection between nodes I2 and H1, $w_7$ is applied to the connection between nodes H1 and O2, and so on.

TABLE 1

| Weight | Nodes |
|---|---|
| $w_1$ | I1, H1 |
| $w_2$ | I2, H1 |
| $w_3$ | I1, H2 |
| $w_4$ | I2, H2 |
| $w_5$ | H1, O1 |
| $w_6$ | H2, O1 |
| $w_7$ | H1, O2 |
| $w_8$ | H2, O2 |

For purpose of demonstration, initial input values are set to $X_1=0.05$ and $X_2=0.10$, and the desired output values are set to $Y^*_1=0.01$ and $Y^*_2=0.99$. Thus, the goal of training ANN 700 is to update the weights over some number of feed forward and backpropagation iterations until the final output values 710 are sufficiently close to $Y^*_1=0.01$ and $Y^*_2=0.99$ when $X_1=0.05$ and $X_2=0.10$. Note that use of a single set of training data effectively trains ANN 700 for just that set. If multiple sets of training data are used, ANN 700 will be trained in accordance with those sets as well.

1. Example Feed Forward Pass

To initiate the feed forward pass, net inputs to each of the nodes in hidden layer 706 are calculated. From the net inputs, the outputs of these nodes can be found by applying the activation function.

For node H1, the net input $net_{H1}$ is:

$$net_{H1} = w_1 X_1 + w_2 X_2 + b_1 \qquad (4)$$
$$= (0.15)(0.05) + (0.20)(0.10) + 0.35 = 0.3775$$

Applying the activation function (here, the logistic function) to this input determines that the output of node H1, $out_{H1}$ is:

$$out_{H1} = \frac{1}{1+e^{-net_{H1}}} \qquad (5)$$
$$= 0.593269992$$

Following the same procedure for node H2, the output $out_{H2}$ is 0.596884378. The next step in the feed forward iteration is to perform the same calculations for the nodes of output layer 708. For example, net input to node O1, $net_{O1}$ is:

$$net_{O1} = w_5 out_{H1} + w_6 out_{H2} + b_2 \qquad (6)$$
$$= (0.40)(0.593269992) + (0.45)(0.596884378) + 0.60$$
$$= 1.105905967$$

Thus, output for node O1, $out_{O1}$ is:

$$out_{O1} = \frac{1}{1+e^{-net_{O1}}} \qquad (7)$$
$$= 0.75136507$$

Following the same procedure for node O2, the output $out_{O2}$ is 0.772928465. At this point, the total error, $\Delta$, can be determined based on a loss function. In this case, the loss function can be the sum of the squared error for the nodes in output layer 708. In other words:

$$\Delta = \Delta_{O1} + \Delta_{O2} \qquad (8)$$
$$= \frac{1}{2}(out_{O1} - \hat{Y}_1)^2 + \frac{1}{2}(out_{O2} - \hat{Y}_2)^2$$
$$= \frac{1}{2}(0.75136507 - 0.01)^2 + \frac{1}{2}(0.772928465 - 0.99)^2$$
$$= 0.274811083 + 0.023560026 = 0.298371109$$

The multiplicative constant ½ in each term is used to simplify differentiation during backpropagation. Since the overall result can be scaled by a learning rate a (see below), this constant does not negatively impact the training. Regardless, at this point, the feed forward iteration completes and backpropagation begins.

2. Backpropagation

As noted above, a goal of backpropagation is to use Δ to update the weights so that they contribute less error in future feed forward iterations. As an example, consider the weight $w_5$. The goal involves determining how much the change in $w_5$ affects Δ. This can be expressed as the partial derivative $$\frac{\partial \Delta}{\partial w_5}.$$

Using the chain rule, this term can be expanded as:

$$\frac{\partial \Delta}{\partial w_5} = \frac{\partial \Delta}{\partial \text{out}_{O1}} \times \frac{\partial \text{out}_{O1}}{\partial \text{net}_{O1}} \times \frac{\partial \text{net}_{O1}}{\partial w_5} \qquad (9)$$

Thus, the effect on Δ of change to $w_5$ is equivalent to the product of (i) the effect on Δ of change to $\text{out}_{O1}$, (ii) the effect on $\text{out}_{O1}$ of change to $\text{net}_{O1}$, and (iii) the effect on $\text{net}_{O1}$ of change to $w_5$. Each of these multiplicative terms can be determined independently. Intuitively, this process can be thought of as isolating the impact of $w_5$ on $\text{net}_{O1}$, the impact of $\text{net}_{O1}$ on $\text{out}_{O1}$, and the impact of $\text{out}_{O1}$ on Δ.

Ultimately, $$\frac{\partial \Delta}{\partial w_5}$$

can be expressed as:

$$\begin{aligned}\frac{\partial \Delta}{\partial w_5} &= (\text{out}_{O1} - \hat{Y}_1)\text{out}_{O1}(1 - \text{out}_{O1})\text{out}_{H1} \\ &= (0.74136507)(0.18685602)(0.593269992) \\ &= 0.082167041\end{aligned} \qquad (10)$$

Then, this value can be subtracted from $w_5$. Often a learning rate (e.g., a gain), $0 < \alpha \leq 1$, is applied to $$\frac{\partial \Delta}{\partial w_5}$$

to control how aggressively the ANN responds to errors. Assuming that α=0.5, the full expression is $$w_5 = w_5 - \alpha \frac{\partial \Delta}{\partial w_5}.$$

Similar equations can be derived for each of the other weights, $w_6$, $w_7$, and $w_8$ feeding into output layer 708. Each of these equations can be solved using the information above. The results are:

$w_5$=0.35891648

$w_6$=0.40866619

$w_7$=0.51130127

$w_8$=0.56137012     (11)

Next, updates to the remaining weights, $w_1$, $w_2$, $w_3$, and $w_4$ are calculated. This involves continuing the backpropagation pass to hidden layer 706. Considering $w_1$ and using a similar derivation as above:

$$\frac{\partial \Delta}{\partial w_1} = \frac{\partial \Delta}{\partial \text{out}_{H1}} \times \frac{\partial \text{out}_{H1}}{\partial \text{net}_{H1}} \times \frac{\partial \text{net}_{H1}}{\partial w_1} \qquad (12)$$

One difference, however, between the backpropagation techniques for output layer 708 and hidden layer 706 is that each node in hidden layer 706 contributes to the error of all nodes in output layer 708. Therefore:

$$\frac{\partial \Delta}{\partial \text{out}_{H1}} = \frac{\partial \Delta_{O1}}{\partial \text{out}_{H1}} + \frac{\partial \Delta_{O2}}{\partial \text{out}_{H1}} \qquad (13)$$

Similar equations can be for each of the other weights, $w_2$, $w_3$, and $w_4$ feeding into hidden layer 706. Not unlike Equation 9, each of these equations can be solved using the information above. The results are:

$w_1$=0.14978072

$w_2$=0.19956143

$w_3$=0.24975114

$w_4$=0.29950229     (14)

Figure 7B:
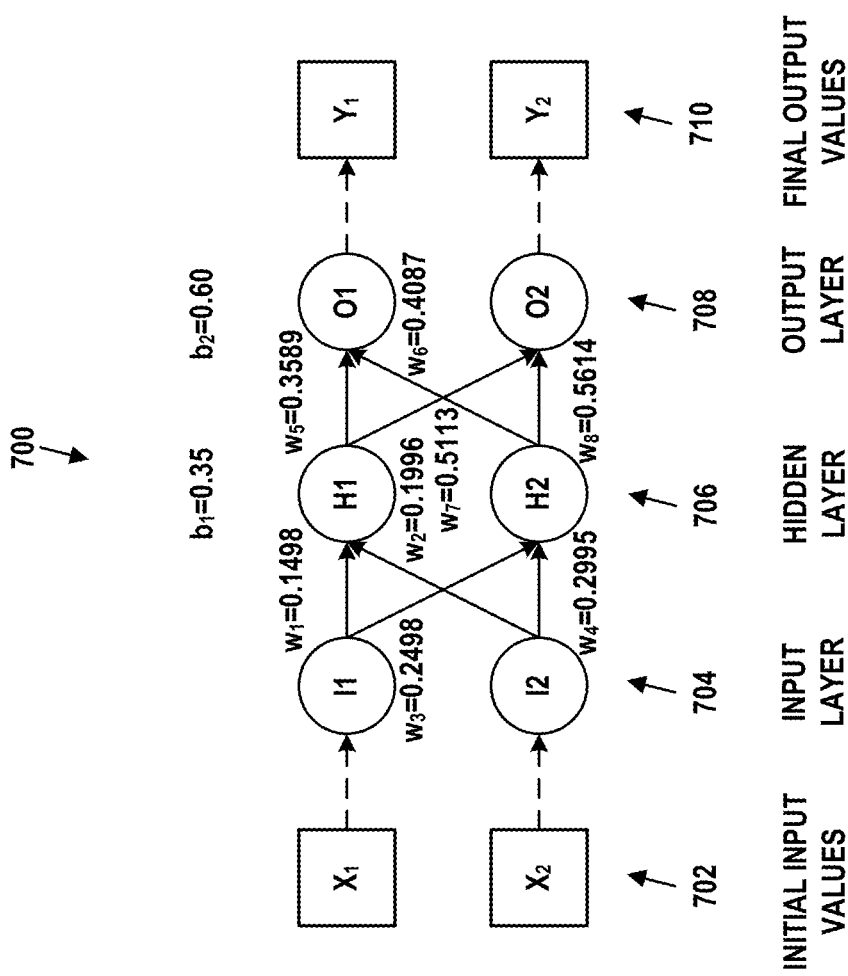
FIG. 7B depicts an ANN in the process of being trained, in accordance with example embodiments.

At this point, the backpropagation iteration is over, and all weights have been updated. FIG. 7B shows ANN 700 with these updated weights, values of which are rounded to four decimal places for sake of convenience. ANN 700 may continue to be trained through subsequent feed forward and backpropagation iterations. For instance, the iteration carried out above reduces the total error, A, from 0.298371109 to 0.291027924. While this may seem like a small improvement, over several thousand feed forward and backpropagation iterations the error can be reduced to less than 0.0001. At that point, the values of $Y_1$ and $Y_2$ will be close to the target values of 0.01 and 0.99, respectively.

In some cases, an equivalent amount of training can be accomplished with fewer iterations if the hyperparameters of the system (e.g., the biases $b_1$ and $b_2$ and the learning rate a) are adjusted. For instance, the setting the learning rate closer to 1.0 may result in the error rate being reduced more rapidly. Additionally, the biases can be updated as part of the learning process in a similar fashion to how the weights are updated.

Regardless, ANN 700 is just a simplified example. Arbitrarily complex ANNs can be developed with the number of nodes in each of the input and output layers tuned to address specific problems or goals. Further, more than one hidden layer can be used and any number of nodes can be in each hidden layer.

VI. NATURAL LANGUAGE PROCESSING OF TEXT QUERIES

Natural language processing is a discipline that involves, among other activities, using computers to understand the structure and meaning of human language. This determined structure and meaning may be applicable to the processing of IT incidents, as described below. But incident reports may relate to information other that IT incidents, and may encompass customer service management uses and other uses as well.

Each incident may be represented as an incident report. While incident reports may exist in various formats and contain various types of information, an example incident report 800 is shown in FIG. 8. Incident report 800 consists of a number of fields in the left column, at least some of which are associated with values in the right column.

Field 802 identifies the originator of the incident, in this case Bob Smith. Field 804 identifies the time at which the incident was created, in this case 9:56 AM on Feb. 7, 2018. Field 805 is a text string that provides a short description of the problem. Field 806 identifies the description of the problem, as provided by the originator. Thus, field 806 may be a free-form text string containing anywhere from a few words to several sentences or more. Field 808 is a categorization of the incident, in this case email. This categorization may be provided by the originator, the IT personnel to whom the incident is assigned, or automatically based on the context of the problem description field.

Field 810 identifies the IT personnel to whom the incident is assigned (if applicable), in this case Alice Jones. Field 812 identifies the status of the incident. The status may be one of "open," "assigned," "working," or "resolved" for instance. Field 814 identifies how the incident was resolved (if applicable). This field may be filled out by the IT personnel to whom the incident is assigned or another individual. Field 816 identifies the time at which the incident was resolved, in this case 10:10 AM on Feb. 7, 2018. Field 818 specifies the closure code of the incident (if applicable) and can take on values such as "closed (permanently)", "closed (work around)", "closed (cannot reproduce)", etc. Field 820 identifies any additional notes added to the record, such as by the IT personnel to whom the incident is assigned. Field 822 identifies a link to an online article that may help users avoid having to address a similar issue in the future.

Incident report 800 is presented for purpose of example. Other types of incident reports may be used, and these reports may contain more, fewer, and/or different fields.

Incident reports, such as incident report 800, may be created in various ways. For instance, by way of a web form, an email sent to a designated address, a voicemail box using speech-to-text conversion, and so on. These incident reports may be stored in an incident report database that can be queried. As an example, a query in the form of a text string could return one or more incident reports that contain the words in the text string.

Figure 9:
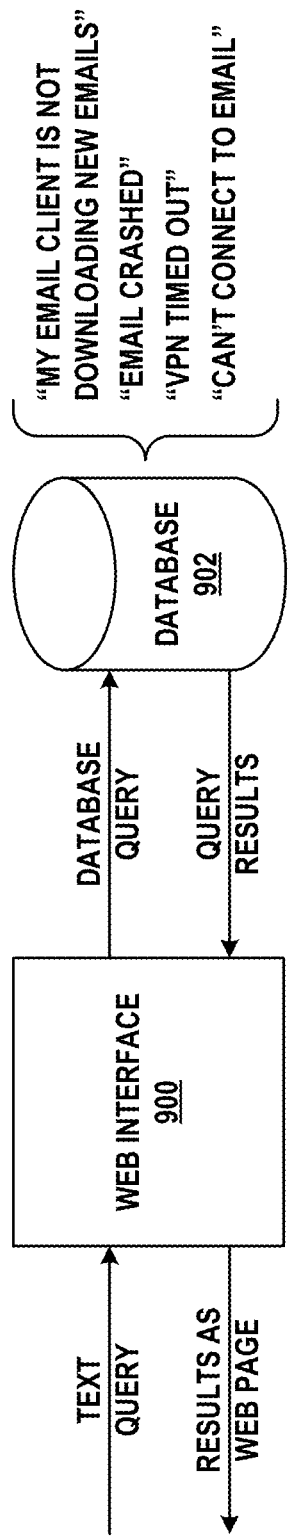
FIG. 9 depicts a database query architecture, in accordance with example embodiments.

This process is illustrated in FIG. 9. A text query may be entered into web interface 900. This web interface may be supplied by way of a computational instance of remote network management platform 320. Web interface 900 converts the text query into a database query (e.g., an SQL query), and provides the SQL query to database 902. This database may be CMDB 500 or some other database. Database 902 contains a number of incident reports with problem description fields as shown in FIG. 8. Regardless, database 902 conducts the query and returns matching results to web interface 900. One or more such results may be returned. Web interface 900 provides these results as a web page.

For example, if the text query is "email", web interface 900 may convert this query into an SQL query of database 902. For example, the query may look at the problem description field of a table containing incident reports. Any such incident report that matches the query—i.e., includes the term "email"—may be provided in the query results. Thus, the incident reports with the problem descriptions of "My email client is not downloading new emails", "Email crashed", and "Can't connect to email" may be provided, while the incident report with the problem description "VPN timed out" is not returned.

This matching technique is simplistic and has a number of drawbacks. It only considers the presence of the text of the query in the incidents. Thus, it does not consider contextual information, such as words appearing before and after the query text. Also, synonyms of the query text (e.g., "mail" or "message") and misspellings of the query text (e.g., "emial") would not return any results in this example.

Furthermore, deploying such a solution would involve use of an inefficient sparse matrix, with entries in one dimension for each word in the English language and entries in the other dimension for the problem description of each incident. While the exact number of English words is a matter of debate, there are at least 150,000-200,000, with less than about 20,000 in common use. Given that a busy IT department can have a database of tens of thousands to millions of incidents, this matrix would be quite large and wasteful to store even if just the 20,000 most commonly used words are included.

VII. NATURAL LANGUAGE PROCESSING OF TEXT QUERIES WITH CONTEXT

The embodiments herein introduce improvements to text query matching related to incident reports. These improvements include matching based on context, and an ANN model that provides compact semantic representations of words and text strings that saves a significant amount of memory over simple word matrix based approaches. In the discussion below, there are two approaches for training an ANN model to represent the sematic meanings of words: word vectors and paragraph vectors. These techniques may be combined with one another or with other techniques.

A. Word Vectors

Figure 10A:
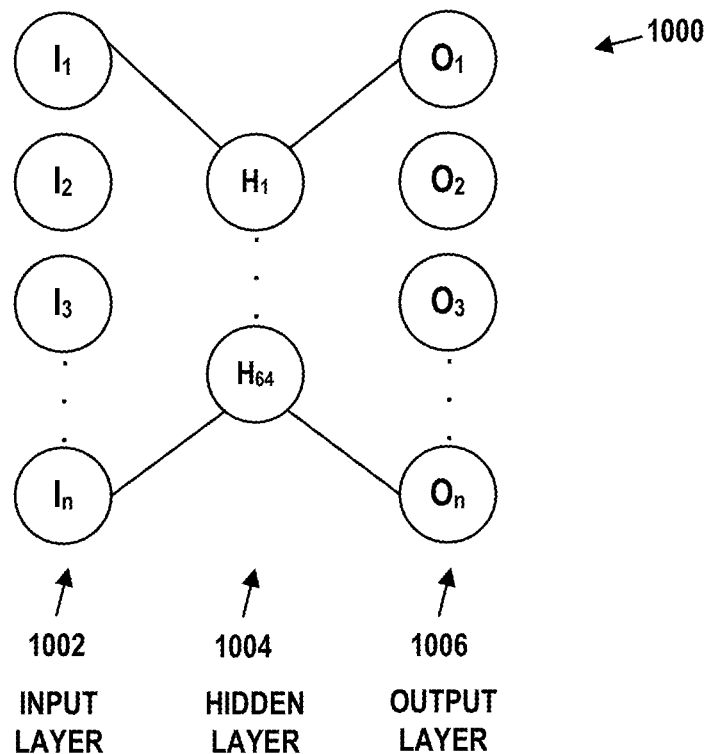
FIG. 10A depicts an ANN configured for learning the contextual meanings of words, in accordance with example embodiments.

An ANN may be trained with a large number of text strings from the database to determine the contextual relationships between words appearing in these text strings. Such an ANN 1000 is shown in FIG. 10A. ANN 1000 includes input layer 1002, which feeds into hidden layer 1004, which in turn feeds into output layer 1006. The number of nodes in input layer 1002 and output layer 1006 may be equivalent to the number of words in a pre-defined vocabulary or dictionary (e.g., 20,000, 50,000, or 100,000). The number of nodes in hidden layer 1004 may be much smaller (e.g., 64 as shown in FIG. 10A, or other values such as 16, 32, 128, 512, 1024, etc.).

Figure 10B:
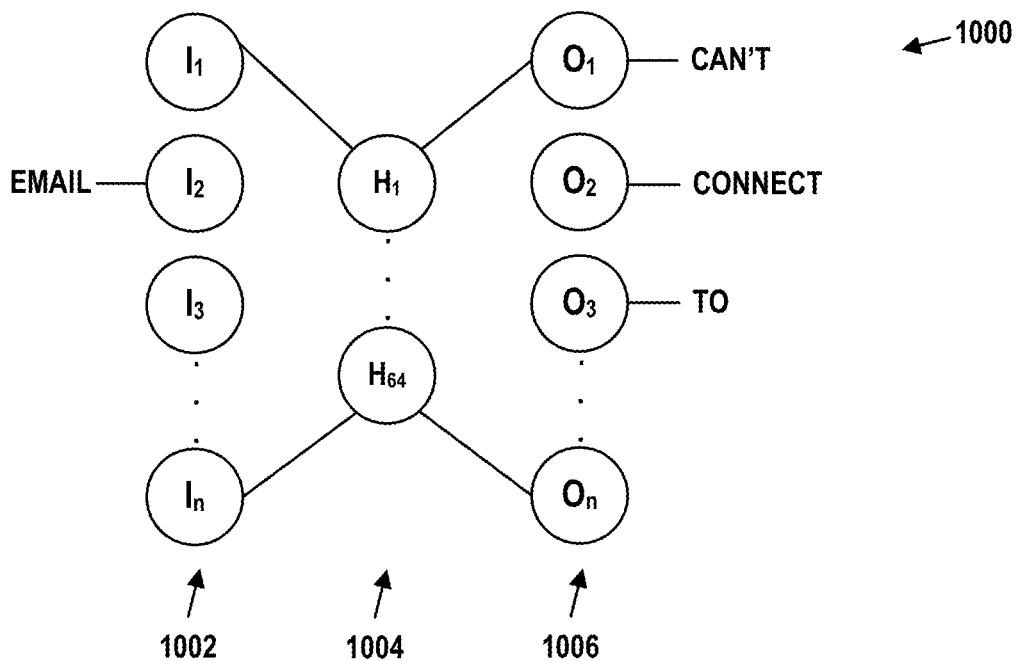
FIG. 10B depicts a set of training data for the ANN of FIG. 10A, in accordance with example embodiments.

For each text string in the database, ANN 1000 is trained with one or more arrangements of words. For instance, in FIG. 10B, ANN 1000 is shown being trained with input word "email" and output (context) words "can't", "connect" and "to". The output words serve as the ground truth output values to which the results produced by output layer 1006 are compared. This arrangement reflects that "email" appears proximate to "can't", "connect" and "to" in a text string in database 902.

In an implementation, this could be represented as node $I_2$ receiving an input of 1, and all other nodes in input layer 1002 receiving an input of 0. Similarly, node $O_1$ has a ground truth value of "can't", node $O_2$ has a ground truth value of "connect", and node $O_3$ has a ground truth value of "to". In the implementation, this could be represented as nodes $O_1$, $O_2$, and $O_3$ being associated with ground truth values of 1 and all other nodes in output layer 1006 having ground truth values of 0. The loss function may be a sum of squared errors, for example, between the output of output layer 1006 and a vector containing the ground truth values.

Figure 10C:
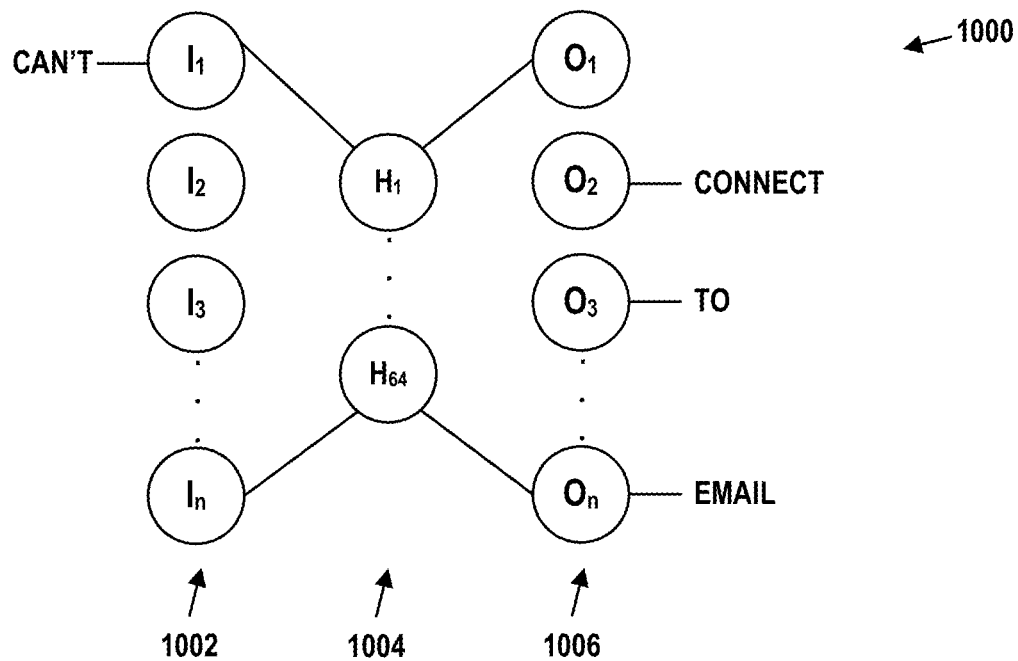
FIG. 10C depicts a set of training data for the ANN of FIG. 10A, in accordance with example embodiments.
Figure 10D:
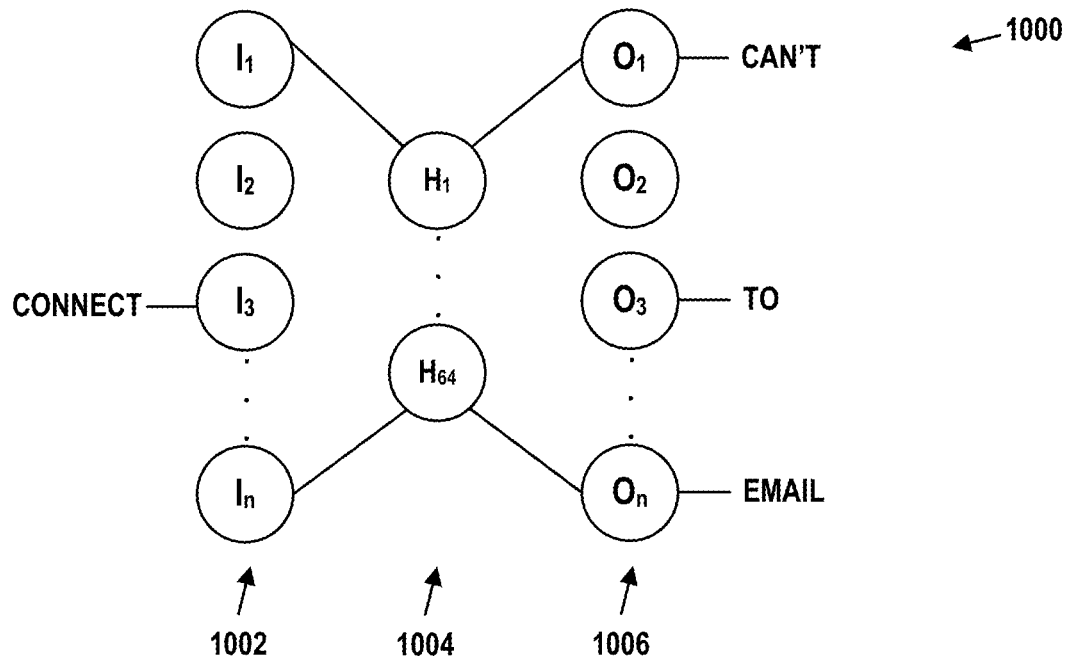
FIG. 10D depicts a set of training data for the ANN of FIG. 10A, in accordance with example embodiments.

Other arrangements of this text string from database 902 may be used to train ANN 1000. For instance, as shown in FIG. 10C, the input word may be "can't" and the output words may be "connect", "to", and "email." In another example, as shown in FIG. 10D, the input word may be "connect" and the output words may be "can't", "to", and "email."

In general, these arrangements may be selected so that the output words are within w words of the input word (e.g., where w could be 1, 2, 3, 5, etc.), the output words are in the same sentence as the input word, the output words are in the same paragraph as the input word, and so on. Furthermore, various word arrangements of each text string in database 902 may be used to train ANN 1000. These text strings may be selected from short description field 805, problem description field 806, category field 808, resolution field 814, notes field 820, and/or any other field or combination of fields in an incident report.

After ANN 1000 is trained with these arrangements of text strings, hidden layer 1004 becomes a compact vector representation of the context and meaning of an input word. For example, assuming that ANN 1000 is fully-trained with a corpus of 10,000 or so text strings (though more or fewer text strings may be used), an input word of "email" may have a similar vector representation of an input word of "mail". Intuitively, since hidden layer 1004 is all that ANN 1000 has to determine the context of an input word, if two words have similar contexts, then they are highly likely to have similar vector representations.

In some embodiments, ANN 1000 can be trained with input words associated with the output nodes $O_1 \ldots O_n$ and the output (context) words associated with input nodes $I_1 \ldots I_n$. This arrangement may produce an identical or similar vector for hidden layer 1004.

Furthermore, vectors generated in this fashion are additive. Thus, subtracting the vector representation of "mail" from the vector representation of "email" is expected to produce a vector with values close to 0. However, subtracting the vector representation of "VPN" from the vector representation of "email" is expected to produce a vector with higher values. In this manner, the model indicates that "email" and "mail" have closer meanings than "email" and "VPN".

Vector representations of words can be determined in other ways. For instance, a so-called paragraph vector may be formed for a text string by performing operations (e.g., addition) on a series of vectors found by training an ANN using sample from a sliding window passed over the text string. Such a paragraph vector represents the context and meaning of the entire paragraph, and can be combined with word vectors to provide further context to these word vectors. In alternative embodiments, a word co-occurrence matrix can be decomposed (e.g., using gradient descent) into two much smaller matrices, each containing vector representations of words. Other possibilities exist.

Once vector representations have been determined for all words of interest, linear and/or multiplicative aggregations of these vectors may be used to represent text strings. For instance, a vector for the text string "can't connect to email" can be found by adding together the individual vectors for the words "can't", "connect", "to", and "email". In some cases, an average or some other operation may be applied to the vectors for the words. This can be expressed below as the vector sum of m vectors $v_i$ with each entry therein divided by m, where $i=\{1 \ldots m\}$. But other possibilities, such as weighted averages, exist.

$$v_{avg} = \frac{1}{m}\sum_{i=1}^{m} v_i \tag{15}$$

Regardless of how the aggregations are determined, this general technique allows vector representations for each text string in database 902 to be found. These vector representations may be stored in database 902 as well, either along with their associated text strings or separately.

Figure 11A:
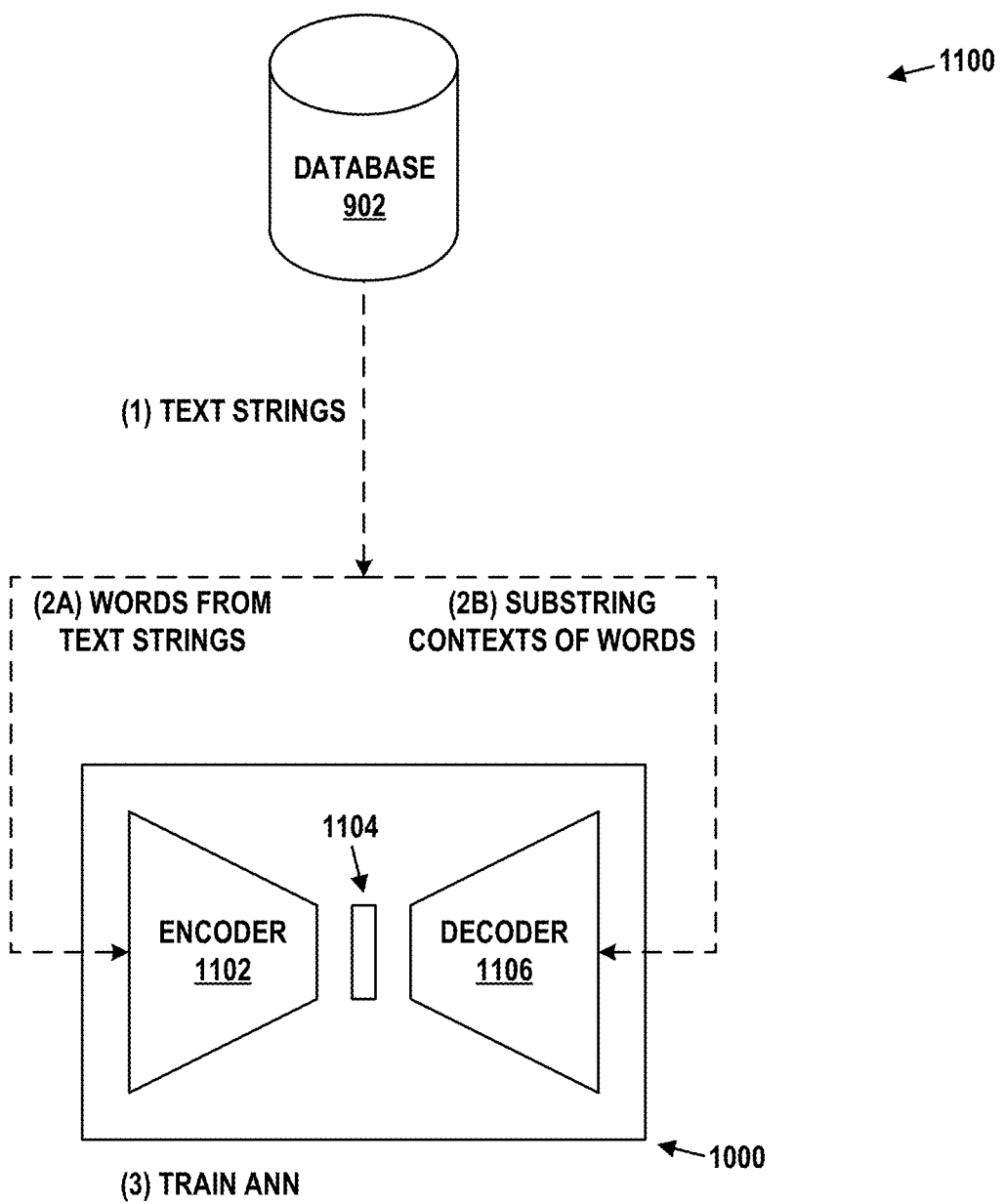
FIG. 11A depicts training an ANN, in accordance with example embodiments.
Figure 11B:
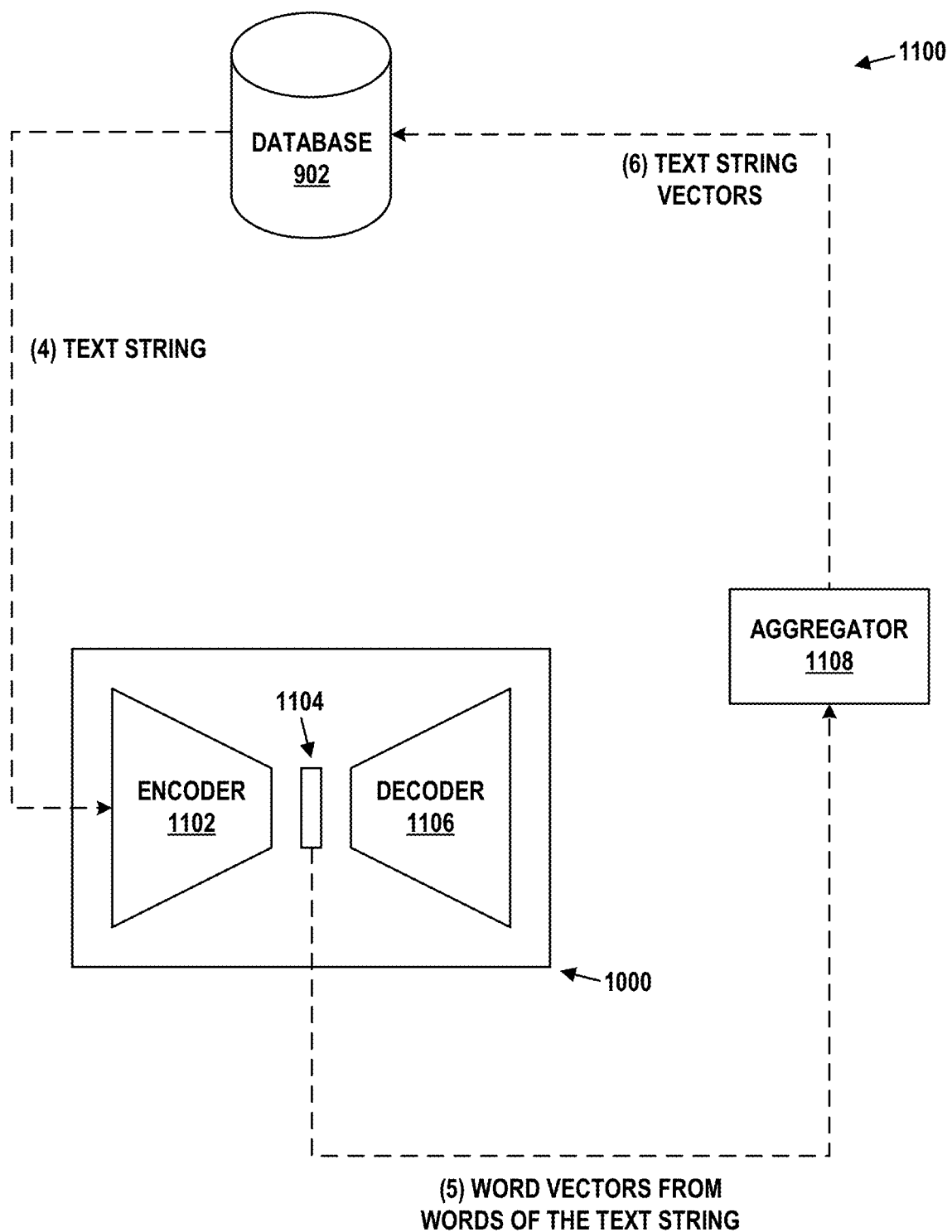
FIG. 11B depicts deriving text string vectors using at least part of a trained ANN, in accordance with example embodiments.
Figure 11C:
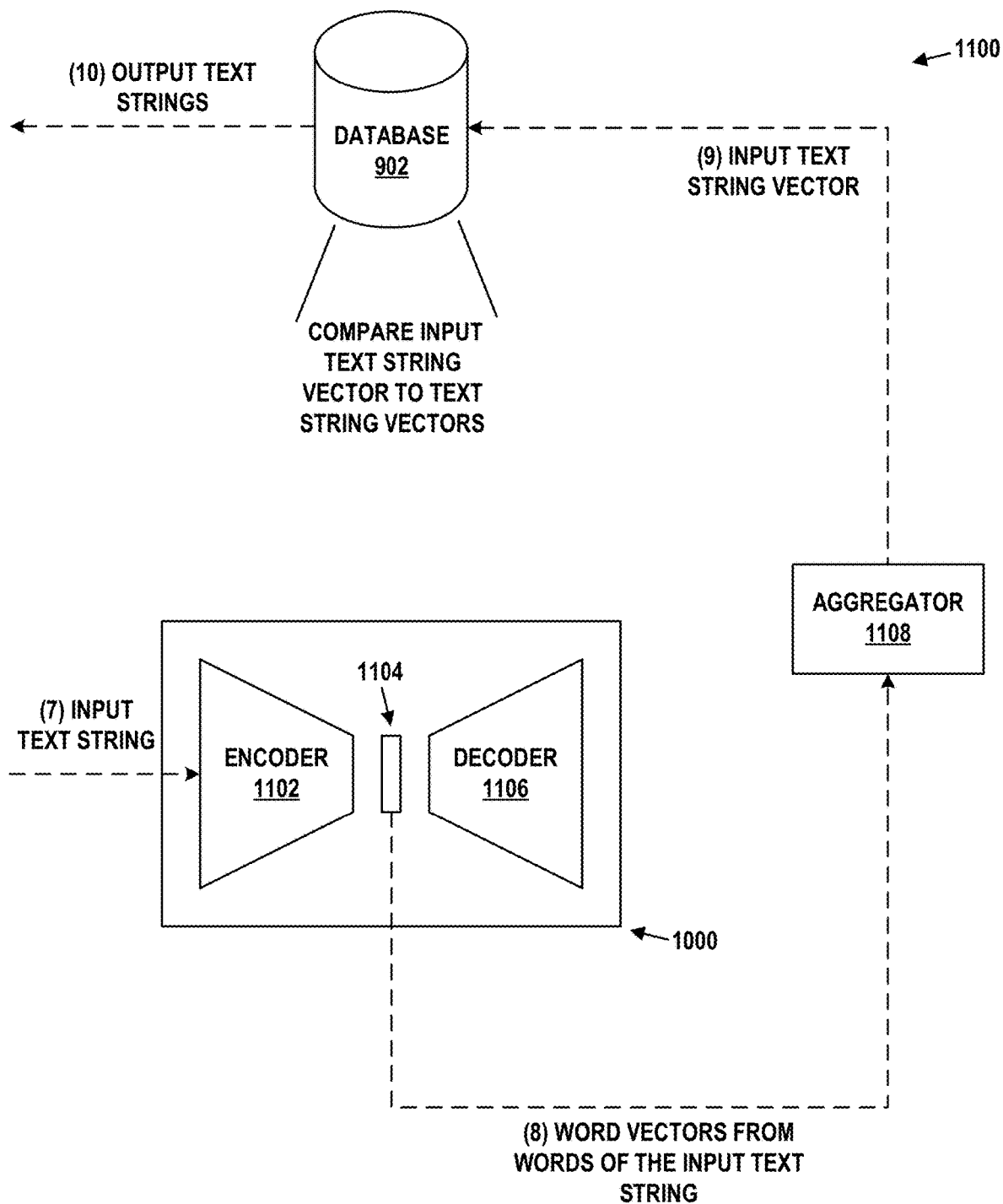
FIG. 11C depicts looking up contextually similar text strings using at least part of a trained ANN, in accordance with example embodiments.

This process is illustrated in FIGS. 11A, 11B, and 11C. FIG. 11A depicts an arrangement 1100 including database 902 and ANN 1000. ANN 1000 is broken up into encoder 1102, vector 1104, and decoder 1106. Encoder 1102 includes input layer 1002 and associated weights, vector 1104 includes hidden layer 1004, and decoder 1106 includes output layer 1006 and associated weights.

At step 1, text strings are obtained from database 902. As noted above, these text strings may be from parts of incident reports. At step 2A, words are extracted from the text strings. The words extracted may be all of the words in the text strings or some of these words. These extracted words are provided as input to ANN 1000. At step 2B, the substring contexts of these words are extracted from the text strings. The substring contexts may be one or more sub strings containing words before, after, or surrounding the associated words extracted at step 2B. As an example, the words and associated substring contexts for the text string of "can't connect to email" are shown in Table 2.

TABLE 2

| Word | Substring Context |
|------|-------------------|
| can't | connect to email |
| connect | can't to email |
| to | can't connect email |
| email | can't connect to |

Thus, for this text string, the four associations of Table 2 are made. In some examples with longer text strings, only words are within w words of the word used as input may be represented in these substrings.

At step 3, ANN 1000 is trained with such associations for a corpus of text strings in database 902. This results in encoder 1102 being capable of producing a vector representation of an input word, where the vector representation encodes a contextual meaning of the word.

Turning to FIG. 11B, the next stage of the process is shown. At step 4, a text string is selected from database 902. Each word of this text string is individually provided to encoder 1102. The corresponding outputs are vector representations of each word (word vectors). At step 5, these word vectors are provided to aggregator 1108. Aggregator 1108 aggregates the word vectors into a text string vector. As noted above, this aggregation may be based on a vector sum or some other operation(s). At step 6, this text string vector is stored in database 902. The storage associates the text string vector with the text string from which it was derived (e.g., in a one to one association).

The process illustrated in FIG. 11B may be repeated for each text string from the corpus of text strings in database

902. Consequently, database 902 ultimately contains an association between each of these text strings and a corresponding text string vector.

Turning to FIG. 11C, the lookup process is shown. At step 7, an input text string is received and provided, word-by-word, to encoder 1102. The input text string may have been typed into a web interface by a user and may be, for example, a problem description of an incident.

At step 8, word vectors from words of the input text string are obtained from vector 1104. These word vectors are provided to aggregator 1108. As noted above, aggregator 1108 aggregates the word vectors into an input text string vector. At step 9, the input text string vector is provided to database 902, or at least to a computing device with access to database 902.

Then, database 902 or this computing device determines matching text string vectors in database 902 according to specific criteria. In this process, cosine similarity (or any other similarity metric) between the input text string and each of the text strings in database 902 may be calculated. As an example, for two vectors u and v each with m entries, cosine similarity may be:

$$s = \frac{\sum_{j=1}^{m} u[j]v[j]}{\sqrt{\sum_{j=1}^{m} u[j]^2} \sqrt{\sum_{j=1}^{m} v[j]^2}} \quad (16)$$

Thus, the higher the value of s, the more similar the two vectors. In some cases, the difference between the vectors may be expressed as a number between 0 and 1 inclusive (i.e., in the range of 0% to 100%).

The comparison may identify one or more text string vectors from database 902 that "match" in this fashion. In some cases this may be the k text string vectors with the highest similarity, or any text string vector with a similarity that is greater than a pre-determined value. The identified text string vectors could correspond to a subset of incident reports, within a greater corpus of incident reports that is recorded in the database 902, that are relevant to an additional incident report that corresponds to the input text string vector. At step 10, for each of the identified text string vectors, the associated text string may be looked up in database 902 and provided as an output text string. In some cases, the associated incident reports may be provided as well.

In some cases, only incident reports that are not older than a pre-determined age are provided. For instance, the system may be configured to identify text string vectors only from incident reports that were resolved within the last 3 months, 6 months, or 12 months. Alternatively, the system may be configured to identify text string vectors only from incident reports that were opened within the last 3 months, 6 months, or 12 months.

In this fashion, incident reports with similar problem descriptions as that of the input text string can be rapidly identified. Notably, this system provides contextual results that are more likely to be relevant and meaningful to the input text string. Consequently, an individual can review these incident reports to determine how similar problems as that in the problem description have been reported and addressed in the past. This may result in the amount of time it takes to resolve incidents being dramatically reduced.

Additionally or alternatively, these embodiments can be applied to detect and identify clusters of semantically and/or contextually similar incident reports within a corpus of incident reports. For example, clusters of incident reports related to a similar issue that is likely to affect users of an IT system, an ongoing misconfiguration of one or more aspects of an IT system, a progressive hardware failure in a component of an IT system, or some other recurring issue within an IT system. Identifying such clusters of related incident reports can allow the IT system to be repaired or upgraded (e.g., by replacing and/or reconfiguring failing or inconsistently performing hardware or software), users to be trained to avoid common mistakes, rarely-occurring hardware or software issues to be detected and rectified, or other benefits.

Such clusters of relevant incident reports can be detected and/or identified by identifying, within the semantically encoded vector space, aggregated word (and/or paragraph) vectors corresponding to the incident reports. A variety of methods could be employed to detect such clusters within the semantically encoded vector space, e.g., k-means clustering, support vector machines, ANNs (e.g., unsupervised ANNs configured and/or trained to identify relevant subsets of training examples within a corpus of available training examples), or some other classifier or other method for identifying clusters of related vectors within a vector space.

B. Paragraph Vectors

As discussed previously, ANN model 1000 uses the surrounding context to provide compact, semantically relevant vector representations of words. After training, words with similar meanings can map to a similar position in the vector space. For example, the vectors for "powerful" and "strong" may appear close to each other, whereas the vectors for "powerful" and "Paris" may be farther apart. Additions and subtractions between word vectors also carry meaning. Using vector algebra on the determined word vectors, we can answer analogy questions such as "King"-"man"+"woman"="Queen."

However, the complete semantic meaning of a sentence or other passage (e.g., a phrase, several sentences, a paragraph, or a document) cannot always be captured from the individual word vectors of a sentence (e.g., by applying vector algebra). Word vectors can represent the semantic content of individual words and may be trained using short context windows. Thus, the semantic content of word order and any information outside the short context window is lost when operating based only on word vectors.

Take for example the sentence "I want a big green cell right now." In this case, simple vector algebra of the individual words may fail to provide the correct semantic meaning of the word "cell," as the word "cell" has multiple possible meanings and thus can be ambiguous. Depending on the context, "cell" could be a biological cell, a prison cell, or a cell of a cellular communications network. Accordingly, the paragraph, sentence, or phrase from which a given word is sampled can provide crucial contextual information.

In another example, given the sentence "Where art thou _____," it is easy to predict the missing word as "Romeo" if sentence was said to derive from a paragraph about Shakespeare. Thus, learning a semantic vector representation of an entire paragraph can help contribute to predicting the context of words sampled from that paragraph.

Figure 12A:
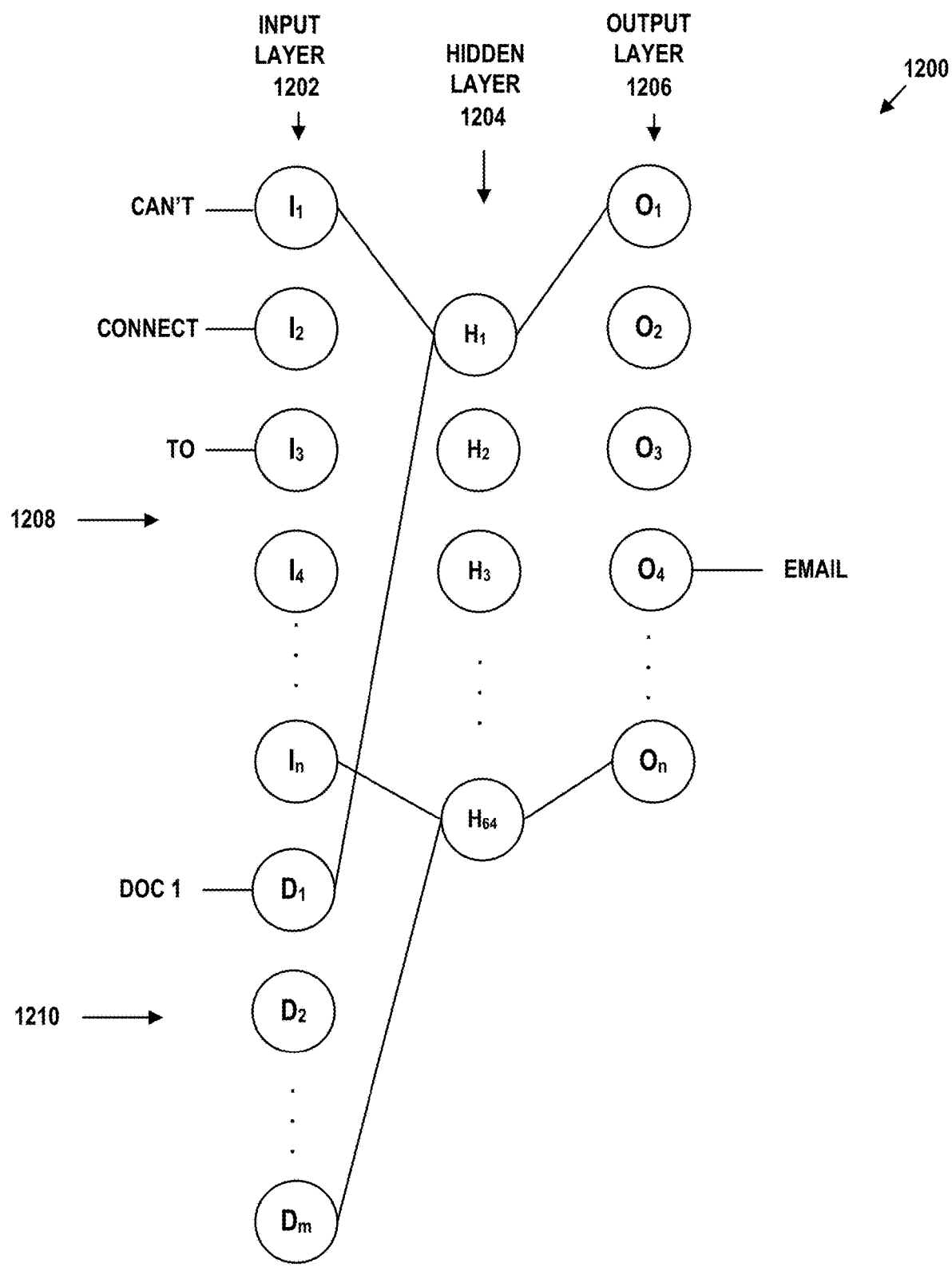
FIG. 12A depicts training an ANN for paragraph vectors, in accordance with example embodiments.

Similar to the methods above for learning word vectors, an ANN or other machine learning structure may be trained using a large number of paragraphs in a corpus to determine the contextual meaning of entire paragraphs, sentences, phrases, or other multi-word text samples as well as to determine the meaning of the individual words that make up the paragraphs in the corpus. Such an ANN 1200 is shown in FIG. 12A. ANN 1200 includes input layer 1202, which feeds into hidden layer 1204, which in turn feeds into output layer 1206. Note that input layer 1202 consists of two types of input substructures, the top substructure 1208 (consisting of input nodes $I_1 \ldots I_n$) representing words and the bottom substructure 1210 (consisting of input nodes $D_1 \ldots D_m$) representing paragraphs (documents). The number of nodes in output layer 1206 and the top input layer substructure 1208 may be equal to the number of unique words in the entire corpus. The number of nodes in the bottom input layer substructure 1210 may be equivalent to the number of unique paragraphs in the entire corpus. Note that "paragraph," as used herein, may be a sentence, a paragraph, one or more fields of an incident report, or some other multi-word string of text.

For each paragraph in the corpus, ANN 1200 is trained with fixed-length contexts generated from moving a sliding window over the paragraph. Thus, a given paragraph vector is shared across all training contexts created from its source paragraph, but not across training contexts created from other paragraphs. Word vectors are shared across training contexts created from all paragraphs, e.g., the vector for "cannot" is the same for all paragraphs. Paragraphs are not limited in size; they can be as large as entire documents or as small as a sentence or phrase. In FIG. 12A, ANN 1200 is shown in a single training iteration, being trained with input word context "can't," "connect" and "to," input paragraph context DOC 1, and output word "email." The output word serves as the ground truth output value to which the result produced by output layer 1206 is compared. This arrangement reflects that "email" appears proximate to "can't", "connect", and "to", and is within DOC 1.

In an implementation, this could be represented as output node $O_4$ receiving a ground truth value of 1 and all other nodes in output layer 1206 having ground truth values of 0. Similarly, node $I_1$ has a ground truth value of "can't," node $I_2$ has a ground truth value of "connect," node $I_3$ has a ground truth value of "to," and node $D_1$ has ground truth value of DOC 1. In the implementation, this could be represented as nodes $I_1$, $I_2$, $I_3$, and $D_1$ being associated with values of 1 and all other nodes in input layer 1202 having values of 0. The loss function may be a sum of squared errors, for example, between the output of output layer 1206 and a vector containing the ground truth values. The weight values of the corresponding word vectors and paragraph vectors, as well all the output layer parameters (e.g., softmax weights) are updated based on the loss function (e.g., via backpropagation).

Figure 12B:
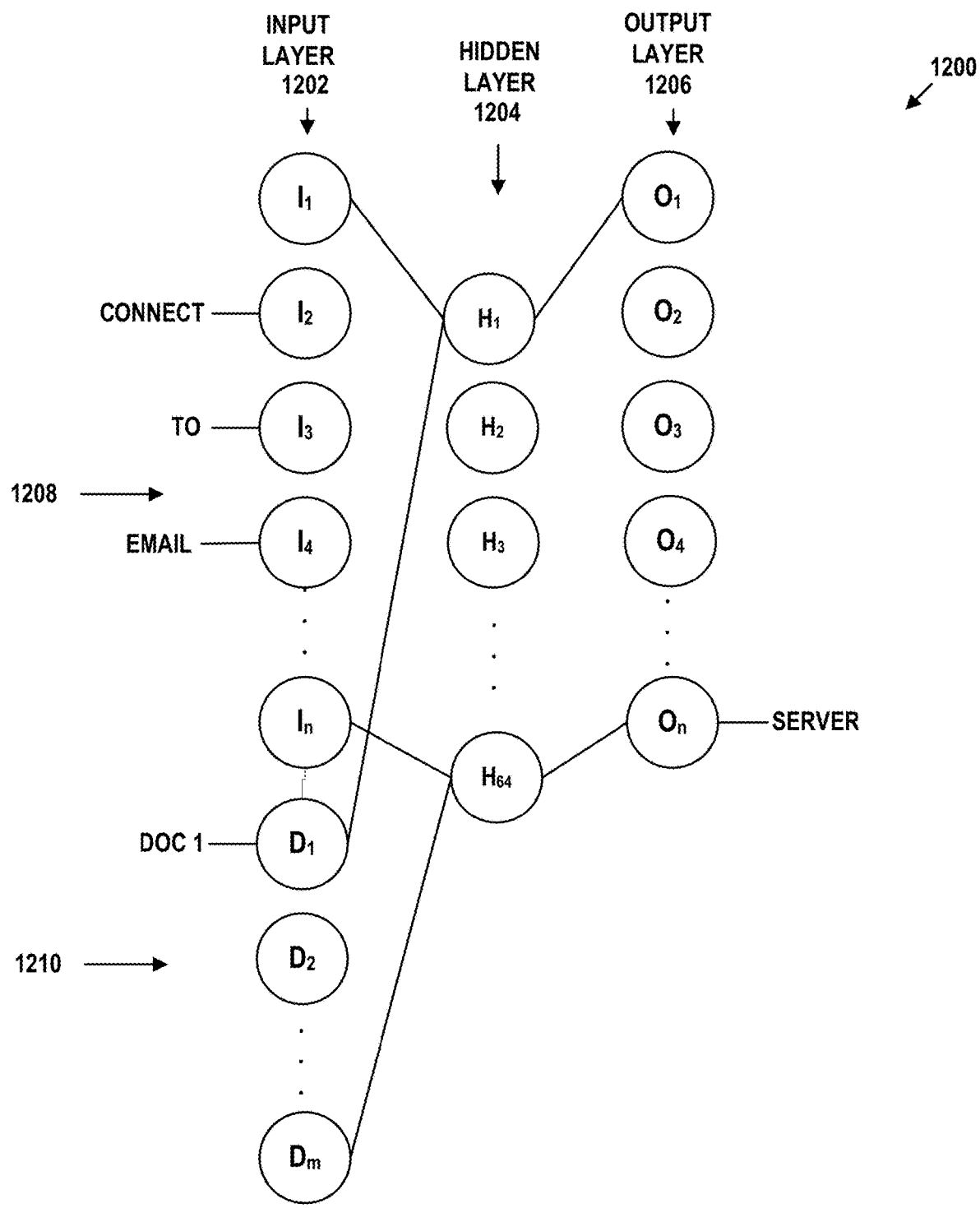
FIG. 12B depicts training an ANN for paragraph vectors, in accordance with example embodiments.

FIG. 12B shows ANN 1200 being trained with a subsequent context window. This context window derives from the same document, but shifts ahead a word in the document and uses input word context "connect," "to" and "email," input paragraph context DOC 1, and output word "server." In an implementation, these inputs and outputs can be encoded with ground truth values as similarly described above.

Figure 12C:
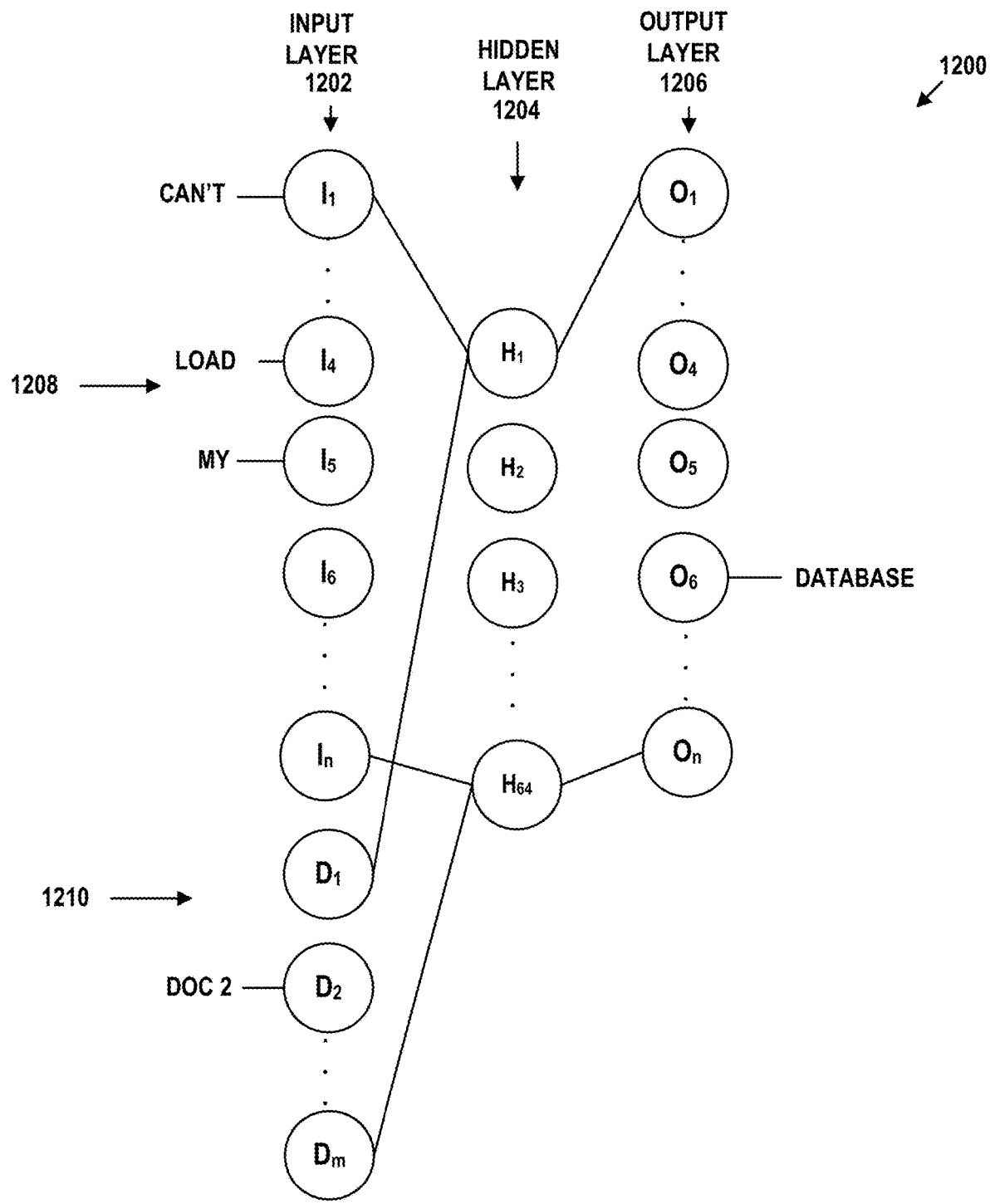
FIG. 12C depicts training an ANN for paragraph vectors, in accordance with example embodiments.

FIG. 12C shows an instance of ANN 1200 trained with another document within the corpus. The context window derives from this document and uses input word context "can't", "load", and "my", input paragraph context DOC 2, and output word "database." In an implementation, these inputs and outputs can be encoded with ground truth values as similarly described above.

After ANN 1200 is trained, the weights associated with hidden layer 1204 become a compact vector representation of the context and meaning of input words and paragraphs. For example, assuming that ANN 1200 is fully-trained with a corpus of 1,000 paragraphs, with the entire corpus containing 10,000 unique words, each paragraph and each word can be represented by a unique vector with a length equal to the number of hidden nodes in hidden layer 1204. This unique vector encodes the contextual meaning of words within the paragraphs or the paragraphs themselves.

Figure 12D:
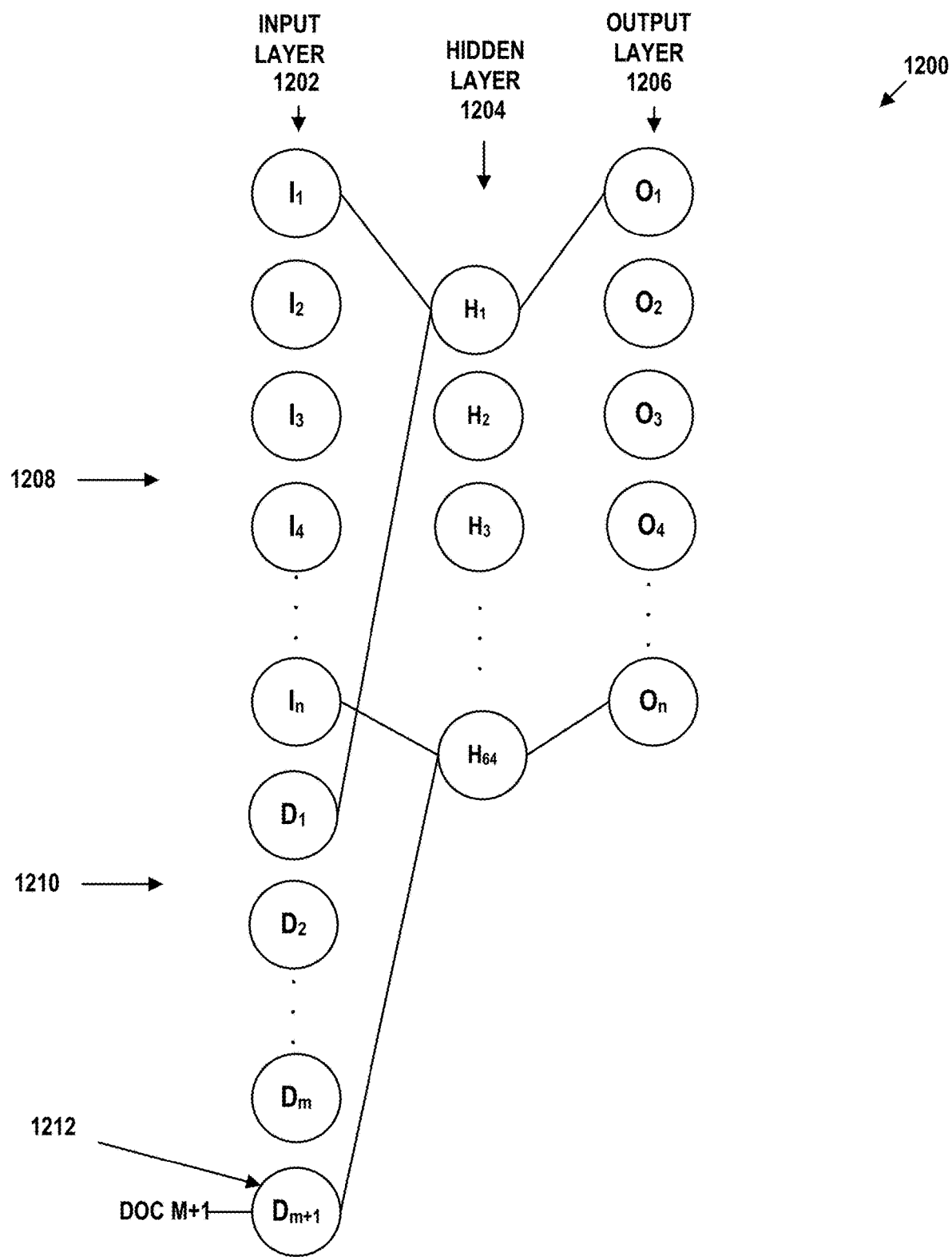
FIG. 12D depicts using a trained ANN to determine the paragraph vector of a previously unseen paragraph, in accordance with example embodiments.

FIG. 12D shows ANN 1200 at prediction time performing an inference step to compute the paragraph vector for a new, previously unseen paragraph. This inference step begins by adding an additional input node 1212 to input layer substructure 1210 that represents the unseen paragraph (DOC M+1). During this inference process, the coefficients of the word vectors substructure 1208 and the learned weights between hidden layer 1204 and output layer 1206 are held fixed. Thus, the model generates an additional paragraph vector 1212, corresponding to the unseen paragraph in the input paragraph vector substructure 1210, to obtain the new semantic vector representation of the unseen paragraph. Any additional unseen paragraphs can be trained through a similar process by adding input nodes to input layer substructure 1210.

Figure 13A:
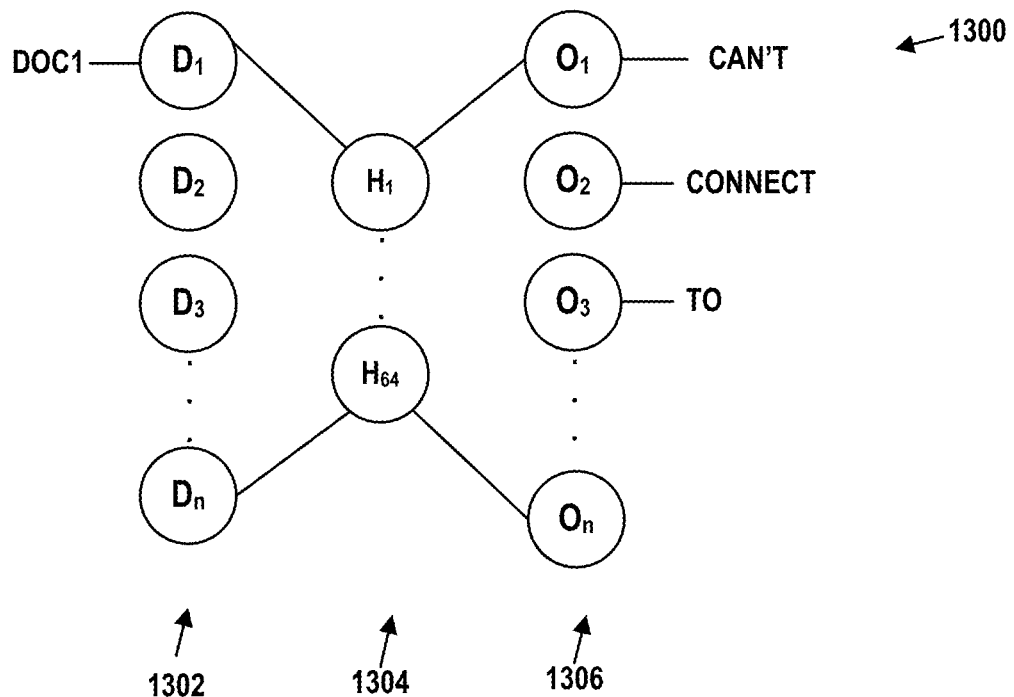
FIG. 13A depicts an alternative mechanism of training an ANN for paragraph vectors, in accordance with example embodiments.
Figure 13B:
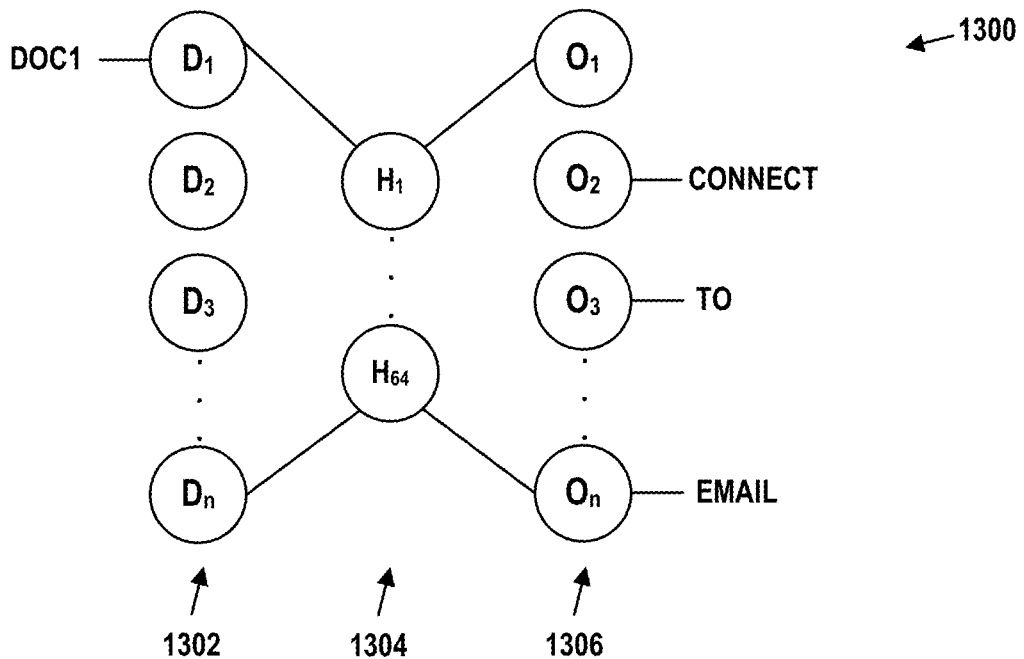
FIG. 13B depicts an alternative mechanism of training an ANN for paragraph vectors, in accordance with example embodiments.

Alternatively, paragraph vectors can be trained by ignoring word context in the input layer, only using the paragraph vector as the input, and forcing the model to predict different word contexts randomly sampled from the paragraph in the output layer. Such an ANN 1300 is shown in FIG. 13A. Input layer 1302 only consists of paragraph vectors, while output layer 1306 represents a single context window that is randomly generated from the given paragraph represented by DOC 1. FIG. 13B shows another context window randomly generated from the same DOC 1 paragraph. Training ANN 1300 may result in a vector representation for the semantic content of paragraphs in the corpus, but will not necessarily provide any semantic vector representations for the words therein.

Once vector representations have been determined for paragraphs in the corpus, linear and multiplicative aggregation of these vectors may be used to represent topics of interest. Furthermore, if the dimensions of paragraph vectors are the same as the dimensions of word vectors, as shown in ANN 1300, then linear and multiplicative aggregation between word vectors and paragraphs vectors can be obtained. For example, finding the Chinese equivalent of "Julius Caesar" using an encyclopedia as a corpus can be achieved by vector operations PV("Julius Caesar")-WV("Roman")+WV("Chinese"), where PV is a paragraph vector (representing an entire Wikipedia article) and WV are word vectors. Thus, paragraph vectors can achieve the same kind of analogies to word vectors with more context-based results.

In practice, such learned paragraph vectors can be used as inputs into other supervised learning models, such as sentiment prediction models. In such models, which can include but are not limited to ANNs, Support Vector Machines (SVMs), or Naïve Bayes Classifiers, paragraph vectors are used as input with a corresponding sentiment label as output. Other metrics such as cosine similarity and nearest neighbors clustering algorithms can be applied to paragraph vectors to find or group paragraphs on similar topics within the corpus of paragraphs.

In the present embodiments, a combination of learned word vectors and paragraph vectors can help determine the structure and meaning of incidents reports, for example incident report 800 as shown in FIG. 8. Incident report 800 consists of a number of fields in the left column, at least some of which are associated with values in the right column. For longer text fields, such as short description field 805, problem description field 806, resolution field 814, and notes field 820, it may be preferable to represent the associated right column text as a paragraph vector to gain more contextual meaning rather than aggregating the individual word vectors that form the text. Incident report 800 is presented for purpose of example. Various fields of an incident report can be arranged to be represented as paragraph vectors, word vectors, or weighted combinations of the two. Other types of incident reports, problem reports, case files, or knowledgebase articles may also be used, and these reports may contain more, fewer, and/or different fields.

After representing different fields as paragraph vectors, word vectors, or weighted combinations of the two, a single vector to represent the entire incident can be generated by concatenating, generating a vector sum, or otherwise aggregating the word and/or paragraph vector representations of the individual incident fields. With a single aggregate incident vector representation, a system can be configured to identify similar aggregate vectors (and therefore similar incident reports) based on cosine similarity or other metrics as discussed above. Alternatively, a search for similar incident reports may use just the paragraph text of one or more individual fields. In this fashion, text from one or more individual fields in an incident report could be combined into a single paragraph of text. A paragraph vector could then be generated from this single, large paragraph of concatenated text and used to search for similar incidents.

This process can be illustrated in terms of the previously described ANN structures. Initially, text strings are obtained from database 902 of FIG. 9. As noted above, these text strings may be from parts of incident reports. Then, words are extracted from the text strings. The words extracted may be all of the words in the text strings or some of these words. These extracted words are provided as input to ANN 1000 of FIGS. 10A-10D. The substring contexts of these words are extracted from the text strings. The substring contexts may be one or more substrings containing words before, after, or surrounding the associated words that were extracted. This results in encoder 1102 of FIGS. 11A-11C being capable of producing a vector representation of an input word, where the vector representation encodes a contextual meaning of the word. The resulting associated word input weights from encoder 1102 and associated word output weights from decoder 1106 of FIGS. 11A-11C are stored in database 902.

For the paragraph vector implementation, ANN 1200 is similarly composed of encoder 1102, vector 1104, and decoder 1106. Encoder 1102 includes input layer 1202 and the associated weights between input layer 1202 and hidden layer 1204. Vector 1104 includes hidden layer 1204. Decoder 1106 includes output layer 1206 and associated weights between hidden layer 1204 and output layer 1206. Note that input layer 1202 consists of two types of input substructures, the top substructure 1208 representing words and the bottom substructure 1210 representing paragraphs (documents).

Next, an incident report is selected from database 902. The incident report is passed through a user filter, which can be a predefined function to extract text from specific fields of interest within the incident report. Using incident report 800 as an example, a user could configure the filter to extract text contained in the short description field 805, problem description field 806 and notes field 820. The extracted text contained in the fields of interest are then joined together to create a single paragraph text representation of the incident report.

Then, this paragraph text is provided to ANN 1200. The weights between the top substructure 1208 and hidden layer 1204 of ANN 1200 may be fixed with the stored word input weights. Similarly, the weights between the hidden layer 1204 and output layer 1206 of ANN 1200 may be fixed with the stored word output weights. ANN 1200 is trained in this configuration with multiple paragraphs, and encoder 1102 is capable of producing a vector representation of a paragraph of text, where the vector representation encodes a contextual meaning of the paragraph of text.

Alternatively, ANN 1200 may be designed to ignore the stored word input and output weights and generate new word vectors based on the text of an input paragraph. As described above, ANN 1200 can be configured to learn paragraph vectors and word vectors simultaneously by sampling word contexts from the input paragraphs. The new word vectors may be arranged to replace the word vectors representations of an equivalent words in database 902. Simultaneous word and paragraph vector training may generate word vectors with closer representations to the input paragraphs, but may result in higher computation costs.

Next, the resulting paragraph vectors from encoder 1202 are stored in database 902. As an example, the process illustrated in FIG. 11B may be repeated for each incident report in database 902. Consequently, database 902 ultimately contains a paragraph vector representation of each incident report, and may store these paragraph vectors in a fashion that associates them with their source incident reports.

The lookup process for a new incident report is as follows. A user creates a new incident report in the system. The input incident may have been typed into a web interface by a user and at a minimum would include a short problem description of an incident. This short problem description (and/or some other field(s) of the incident report) is passed to ANN 1200.

The weights between the top substructure 1208 and hidden layer 1204 of ANN 1200 are fixed with the stored word input weights. Similarly, the weights between the hidden layer 1204 and output layer 1206 of ANN 1200 (e.g., softmax weights) are fixed. Then, ANN 1200 is trained, resulting in encoder 1102 being able to produce a paragraph vector representation of the new incident text, where the vector representation encodes a contextual meaning.

Next, the resulting paragraph vector is provided to database 902, or at least to a computing device with access to database 902. Database 902 or this computing device determines matching paragraph vectors in database 902 according to specific criteria. In this process, cosine similarity (or any other similarity metric) between the paragraph vectors for the input incident report and paragraph vectors for each of the stored incident reports in database 902 may be calculated. Additionally or alternatively, such paragraph vectors may be aggregated (e.g., by concatenation, vector summation and/or averaging, or some other process) to generate aggregate vector representations for each of the stored incident reports in database 902. A cosine similarity (or any other similarity metric) could be determined between the aggregate vectors in order to identify clusters of related incident reports within the database, to identify relevant incident reports related to the input incident report, or to facilitate some other application.

The comparison may identify one or more incident reports from database 902 that "match" in this fashion. In some cases this may be the k incident reports with the highest similarity, or any incident report with a similarity that is greater than a pre-determined value. The user may be provided with these identified incident reports or references thereto.

In some cases, only incident reports that are not older than a pre-determined age are provided. For instance, the system may be configured to only identify incident reports that were resolved within the last 3 months, 6 months, or 12 months. Alternatively, the system may be configured to only identify incident reports that were opened within the last 3 months, 6 months, or 12 months.

In this fashion, incident reports with similar content as that of the input incident report can be rapidly identified. Consequently, an individual can review these incident reports to determine how similar problems as that in the incident have been reported and addressed in the past. This may result in the amount of time it takes to resolve incidents being dramatically reduced.

While this section describes some possible embodiments of word vectors and paragraph vectors, other embodiments may exist. For example, different ANN structures and different training procedures can be used.

VIII. EXAMPLE DATA STRUCTURES FOR EFFICIENT MANAGEMENT OF PARAGRAPH VECTORS

In the context of network management, particularly for a large enterprise or organization, the number of incident reports can be very large. An incident report database, such as database 902, may contain many thousands or tens of thousands of incident reports, such as incident report 800. Database 902, or a related database, could also contain ancillary information, such as knowledgebase articles relevant to existing and/or resolved issues, for example. Further, support personnel may generate new incident reports in response to helping end users who encounter issues or problems. As a result, search and matching operations such as those exemplified above, invoking computation of paragraph and word vectors, may occur very frequently, and potentially involve accessing large numbers of database records. Example embodiments herein describe techniques for significantly increasing the speed and efficiency with which these operations may be performed, compared with direct searching of the database or databases that store the records and other information that need to be searched.

Figure 14:
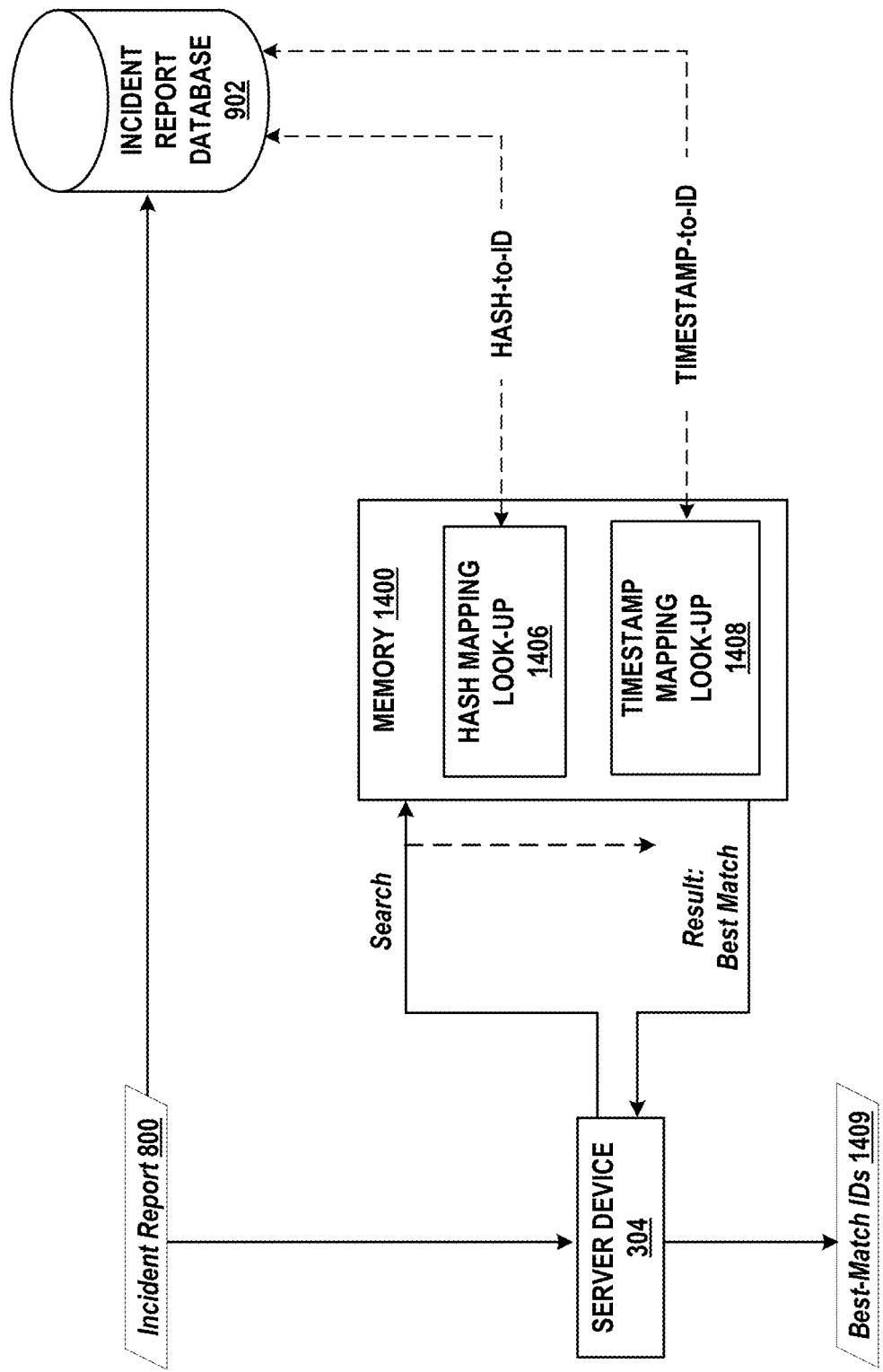
FIG. 14 depicts an example system for carrying out example operations, in accordance with example embodiments.

FIG. 14 illustrates a high-level view of an example embodiment, which includes efficient mapping between voluminous data in a database and data structures defining abbreviated representations of the voluminous data. Architectural components in FIG. 14 include a server device 304, incident report database 902, and memory 1400 for storing a hash mapping look-up 1406 and timestamp mapping look-up 1408. In example embodiments, each incident report in the database 902 is or corresponds to an incident report 800. The memory 1400 could be associated with and/or part of the server device 304, or could be part of the incident report database 902. Other arrangements are possible as well. For example, one or more client devices could include respective deployments of memory 1400, such that the some or all of the particular contents relating to the example techniques, as described below, could be replicated among the one or more client devices. This could enable them to carry out at least some of the operations, in accordance with example embodiments.

As described in more detail below, the hash mapping look-up 1406 includes data structures, each of which associates the hash of a text string with both a pre-calculated paragraph vector of the text string and a list of unique identifiers that are associated with one or more incident reports that include the same text string. This mapping allows a single data structure to represent multiple incident reports that share a common text string. The timestamp mapping look-up 1408 includes data structures, each of which associates a unique timestamp with a list of unique identifiers that are associated with one or more incident reports that have the same timestamp. In an example embodiment, the timestamp could be the creation time 804 or the resolution time 816 of the incident report 800. Other versions of timestamp could be used as well. The mapping correspondences between the hash mapping look-up 1406 and incident reports in the database 902, and between the timestamp mapping look-up 1408 and the incident reports in the database 902, are indicated by the dashed double-ended arrows in FIG. 14.

In an example operation, a new incident report 800 may be entered into the database 902 and also input to the server device 304, as shown. By way of example, a search for matching or similar incident reports may be based on the short description 805 of the incident report 800. However, other text fields of the incident report 800 could be used. In accordance with example embodiments, the short description 805 of the new incident report 800 can be rapidly matched—either identically or by similarity—to a most relevant set of existing incident reports in the database 902 by searching the hash mapping look-up 1406. This can significantly reduce the computational and time costs involved in searching the database 902 directly, since a single data structure in the hash mapping look-up 1406 can represent multiple incident reports by virtue of a common associated text string. In addition, the searching may proceed first by comparing a hash of the new input string with the hash of each data structure. A paragraph vector may be calculated for the new text string only if the hash search fails to identify an exact match. This, too, can save significant computational cost, since paragraph vector calculation may typically be more expensive than hash computation.

Each data structure in the hash mapping look-up 1406 does not necessarily include a list of all incident reports in the database 902 that have the same short description 805. Instead, the list of unique identifiers in each data structure in the hash mapping look-up 1406 may include only those more recent than some date-time threshold, for example. The list of unique identifiers associated with each data structure in the hash mapping look-up 1406 may be kept "fresh" by a procedure that uses the timestamp mapping look-up 1408 with a sliding time window to periodically update the hash mapping look-up 1406. Thus, example embodiments using the hash mapping look-up 1406 and the timestamp mapping look-up 1408 not only provide rapid and efficient search and matching, but also ensure that the relevant search results identify the most recent incident reports. As indicated, the results are returned in the best-match IDs 1409.

FIGS. 15A-15D provide more detailed depictions of the hash mapping look-up 1406 and the timestamp mapping look-up 1408, in accordance with example embodiments. The examples shown in FIGS. 15A-15D also illustrate, in concept, example operation in more detail. Each of FIGS. 15A-15D includes an incident report database 902 of incident report entries 1504. Each incident report entry is shown to include a text string, an ID, a timestamp, and report contents. By way of example, the text string could be a short description 805, the ID could be a key or other unique identifier for accessing the associated database record, the timestamp could be the creation time 804 or the resolution time 816 of the incident report 800, and the report content could be some or all of the other fields of the incident report 800 illustrated in FIG. 8. The report contents could include additional information as well, such as a paragraph vector of the short description or other fields. For purposes of the discussion herein, each incident report entry shown has a unique, but arbitrary numerical identifier. It will be appreciated that other forms of identifier could be used as well or instead.

While each given incident report entry may be unique to a specific incident report entered, for example, by an end user (e.g., network management personnel), the associated string (e.g., short description), will not necessarily be unique to the given incident report entry. For example, a particular unique short description may be shared identically among multiple incident report entries. That is, a particular short description may be unique among known or available short descriptions, but may be the short description to multiple incident report entries. Thus, any quantitative characteristic of the particular short description that is unique to the particular short description will be shared identically among any one or more incident report entries that share that particular short description.

In particular, the hash of a particular text string will be unique to the particular text string. Likewise, a paragraph vector computed for the particular text string will be unique to the particular text string. In accordance with example embodiments, every incident report entry that includes or contains a given text string may be associated with the identical hash string and identical or similar paragraph vector. Namely, the hash of the given text string and the paragraph vector of the given text string. The hash of a text string may be computed as a universal hash function, such that the value is unique for any given input string, and any two or more non-identical strings will have different hash values. In the current examples, the text string used is the short description of the incident report 800. However, unique hash functions of other text strings, including other fields of the incident report 800, or even arbitrary paragraphs or entire knowledgebase articles, could be used in example embodiments.

Figure 15A:
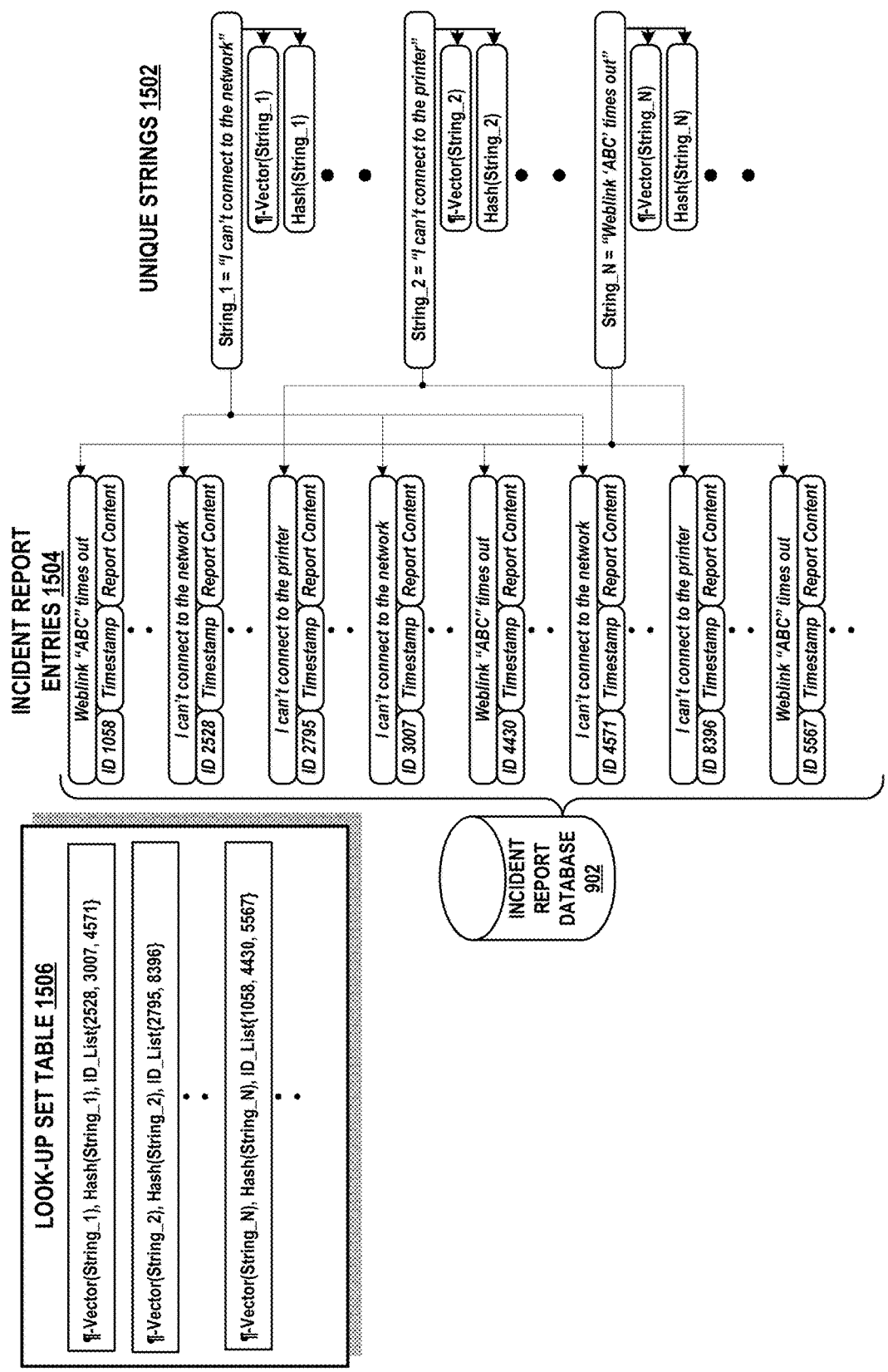
FIG. 15A depicts data structures, in accordance with example embodiments.

The use of uniqueness properties of text strings is illustrated by way of example in FIG. 15A by unique strings 1502, which shows three example strings: String_1="I can't connect to the network," String_2="I can connect to the printer," and String_N="Weblink 'ABC' times out." In the current example illustration, each may be presumed examples of a short description of a respective incident report. Each has a unique paragraph vector (labeled "¶-Vector" in FIGS. 15A-15D). String_1 is evidently associated with three incident report entries: those with IDs 2528, 3007, and 4571, as indicated by arrows pointing from String_1 to these incident report entries. Similarly, String_2 is evidently associated with two incident report entries: those with IDs 2795 and 8396; and String_N and is evidently associated with three incident report entries: those with IDs 1058, 4430, and 5567. The vertical ellipses below the last depicted incident report entry indicates that there may be other entries in the database 902, including those sharing one of the unique strings 1502.

Note that the display of the unique strings 1502 in FIG. 15A (and in FIGS. 15B-15C) does not necessarily imply that there is a specific implemented data structure or structures holding this information, though it is not ruled out. Rather, the list of unique strings 1502 is included in the figure to facilitate the present discussion. That is, it illustrates the concept of unique strings having unique respective hashes and paragraph vectors, and further illustrates the concept of multiple incident report entries having the same text string. But it is not necessarily required that the list of unique strings 1502 be explicitly implemented, for example as one or more data structures. However, the list of unique strings 1502 may be explicitly implemented with the mappings to incident report entries 1504 as shown. Such an implementation could provide further storage efficiency by reducing or eliminating the need for duplicate storage of common information among multiple incident report entries 1504.

In accordance with example embodiments, the uniqueness of the hash and paragraph vector of any given string may be advantageously exploited for devising a data structure that associates information that is identical among multiple incident report entries in the database 902 with a list of unique IDs pointing to at least a subset of those multiple incident report entries. In particular, a subset of incident report entries may be identified such that they represent the most recent among all incident report entries having the same unique hash string and a similar paragraph vector. A collection such data structures for every unique string 1502 may thus represent all of the most recent incident report entries associated with the unique strings.

Then, given a new input string (e.g., a new short description), such a collection provides for fast and efficient look-up of relevant, existing incident reports. In the present disclosure, each data structure is referred to a "look-up set" because it associates a unique hash and paragraph vector with a set of unique IDs of entries in the database 902. The collection of look-up sets is referred to herein and a "look-up set table."

An example look-up set table 1506 is shown in the upper left side of FIG. 15A. The example corresponds to the unique strings 1502 and incident report entries 1504 in FIG. 15A. As shown, there are three look-up set data structures, one for each the three unique strings 1502. The vertical ellipses following the third look-up set data structure indicates that there could be other look-up sets for other unique strings. In particular, the look-up set table 1506 may contain an entry—i.e., a look-up set data structure—for every known unique text string. That is, if a unique text string is known—i.e., can be found among the unique text strings 1502—then there will be an associated entry in the look-up set table 1506.

In the example illustrated, the first look-up set data structure for String_1 includes a pre-calculated unique paragraph vector for String_1, a unique hash for String_1, and an "ID_List{2528, 3007, 4571}" that identifies the associated incident report entries 1504 that include or contain String_1. Similarly, the second look-up set data structure for String_2 includes a pre-calculated unique paragraph vector for String_2, a unique hash for String_2, and an "ID_List{2795, 8396}" that identifies the associated incident report entries 1504 that include or contain String_2; and the third look-up set data structure for String_N includes a pre-calculated unique paragraph vector for String_N, a unique hash for String_N, and an "ID_List{1058, 4430, 5567}" that identifies the associated incident report entries 1504 that include or contain String_N.

In an example embodiment, the pre-calculated paragraph vector for each string could include 100 components (or dimensions), each being a real-valued number (e.g. a floating-point number). The pre-calculation of each paragraph vector could be carried out as part of an initialization of an incident reporting system using a corpus of known or available short descriptions (or other text strings), and be based on methods such as those described above. Additionally or alternatively, the pre-calculation step could be carried out for each new text string upon the first occurrence of an incident report with the new text string. Thus, pre-calculation could be a bulk operation on a corpus, incremental, or some combination of both.

Similarly, computation of the hash of each text string could be a bulk operation on a corpus, incremental, or some combination of both. In an example embodiment, each hash function could be a string variable of S bytes, where S is a positive integer. Non-limiting example values of S could be 64, 128, or 256.

As is evident in the current example, three look-up set data structures represent eight distinct incident report entries in database 902. This savings on storage can be many times larger, depending on the number of entries in the database 902, the number of unique strings 1502, and the number of IDs in the ID Lists of each look-up set data structure of the look-up set table 1506. However, in addition to the savings of storage space, the design of the look-up set data structure also enables fast and efficient search by reducing the number of database entries that need to be directly accessed, and at the same time enabling the search to proceed first on the basis of a computed hash of a new input string, and only invoking a paragraph vector computation if an identical hash is not found among the look-up set data structures of the look-up table 1506.

Figure 15B:
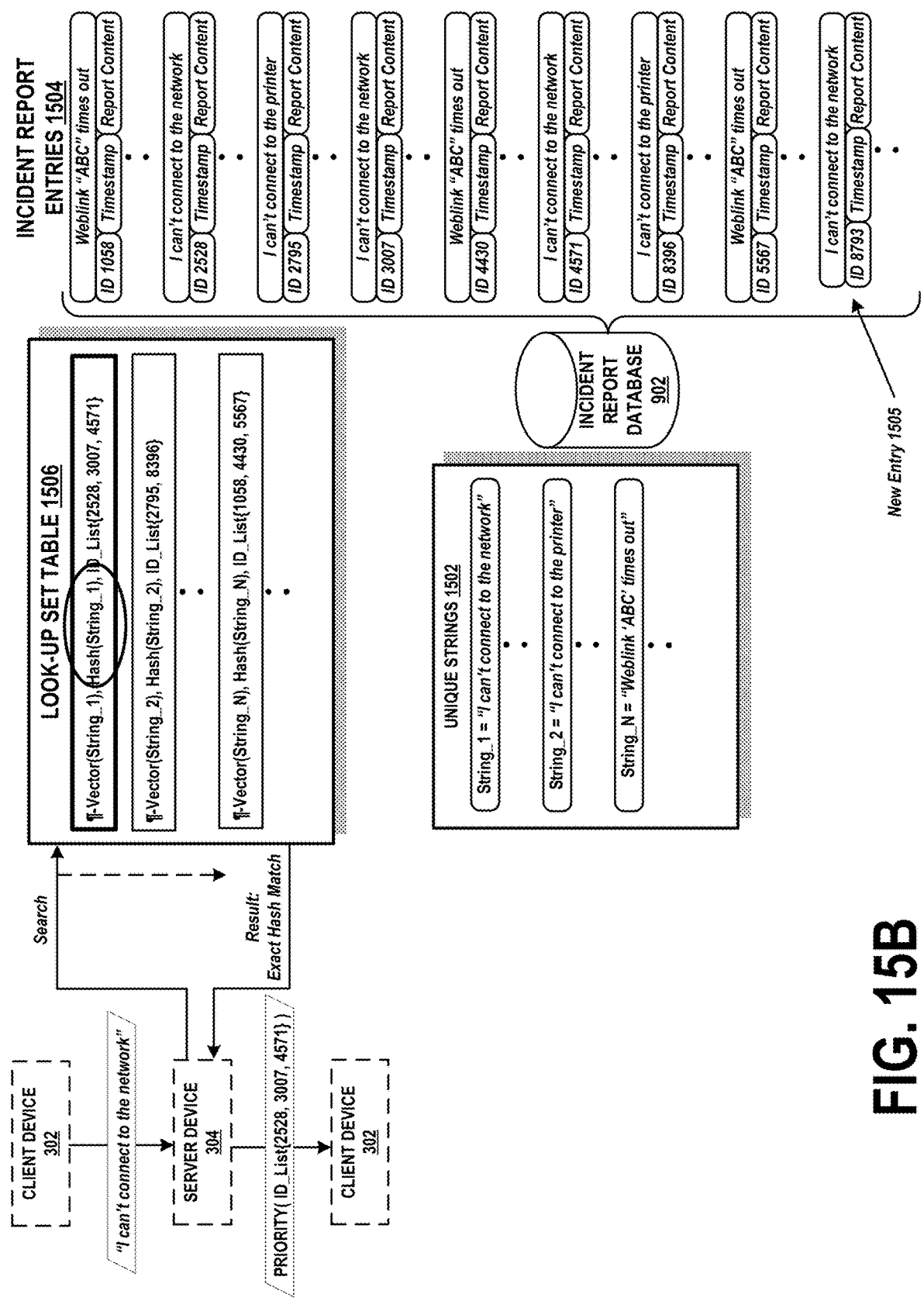
FIG. 15B depicts an aspect of operations using the data structures of FIG. 15A, in accordance with example embodiments.

FIG. 15B illustrates an example search for the case of an input string that exactly matches an existing unique string. For purposes of brevity, the hash and paragraph vector fields of unique strings 1502 are omitted in FIG. 15B. As shown by way of example, a client device 302 sends an input string "I can't connect to the network" to a server device 304. The source of this string could be the short description of an incident report created and entered by an end user at the client device 320, for example. The server device 304 then searches the look-up set table 1506 for a hash of "I can't connect to the network" and finds an identical match at (by way of example) the first look-up set data structure. The result of the search is the ID_List{2528, 3007, 4571} of the best match incident report entries. The server device 304 may then apply a further prioritization to the list of IDs, and return the prioritized list to the client device 302. For example, the original list may not be ordered from most to least recent database entry. Prioritization could thus apply such a sorting. Additionally or alternatively, the server device 304 could return a prioritized listing of the content associated with each incident report entry. Other possible forms of returned data and prioritization/sorting schemes could be used as well.

In addition to the look-up carried out by the server device 304, the new input text string is associated with a new incident report that is entered in the database 902. This is indicated in FIG. 15B as New Entry 1505, having a new unique ID=8793.

Figure 15C:
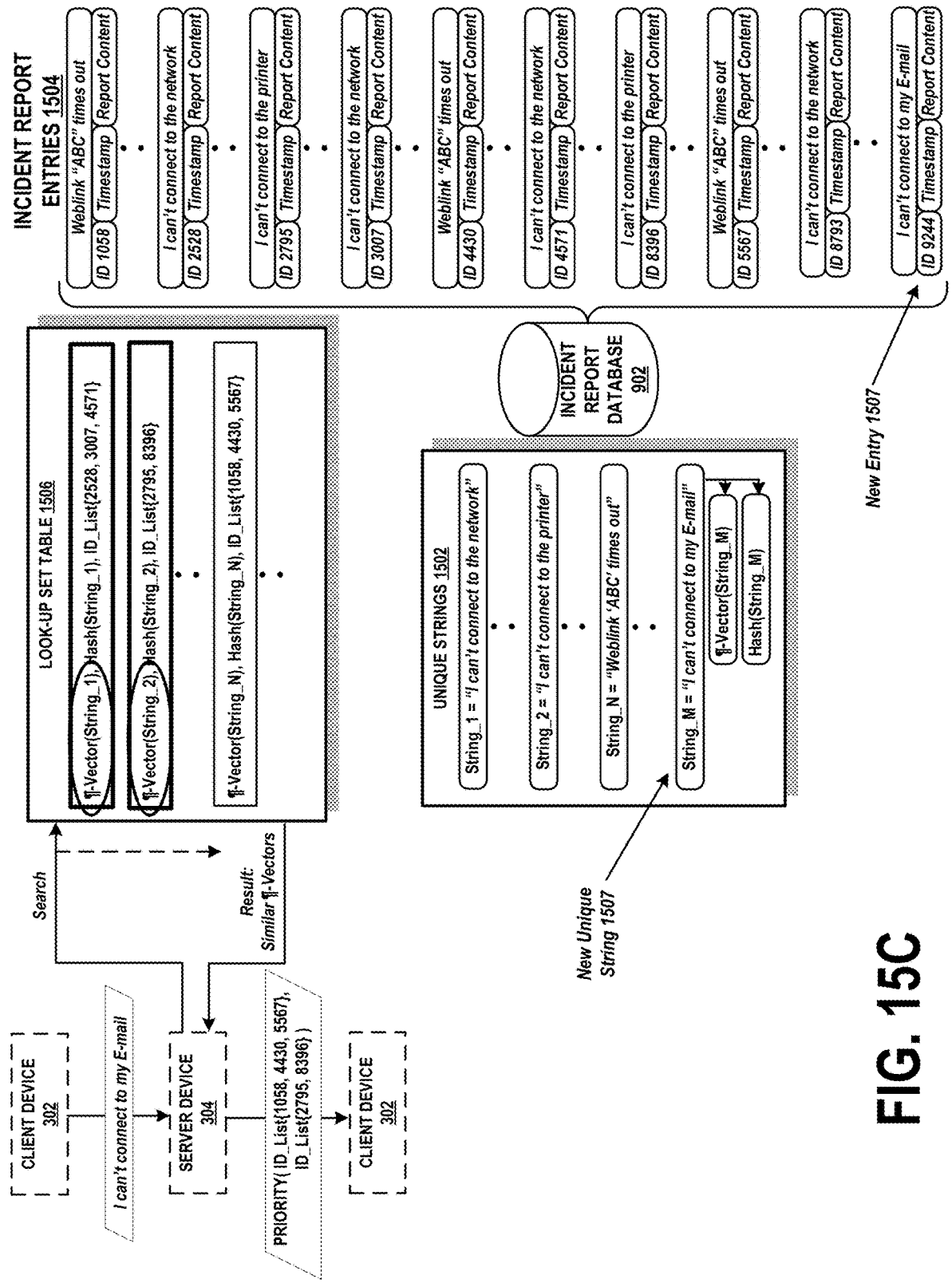
FIG. 15C depicts another aspect of operations using the data structures of FIG. 15A, in accordance with example embodiments.

FIG. 15C illustrates an example search for the case of an input string that does not match any existing unique string. Again, the hash and paragraph vector fields of unique strings 1502 are omitted in FIG. 15C, except for a new unique string that results from the search, as described below. As shown by way of example, a client device 302 sends an input string "I can't connect to my E-mail" to a server device 304. The server device 304 then searches the look-up set table 1506 for a hash of "I can't connect to my E-mail" and does not find any identical match in any of look-up set data structures. This means that there are no other incident report entries in the database 902 with this exact string, a result determined without searching the entire database 902.

Having failed to find an exact hash-based match, the server device 304 then calculates a paragraph vector for the new input string according to techniques described above, and then performs a new search, this time looking for similar paragraph vectors among the look-up set structures in table 1506. As described above, the similarity search could be based on cosine similarity, for example. For the illustration shown in FIG. 15C, the search identifies (by way of example) the first two look-up set structures. That is, the respective paragraph vectors for String_1 and String_2 are deemed to be within pre-defined criteria of similarity or closeness to the paragraph vector calculated for the new input string. The result of the search are the ID_List{2528, 3007, 4571} and ID_List{2795, 8396}. Again, the server device 304 may then apply a further prioritization to the list of IDs, and return the prioritized list to the client device 302. Additionally or alternatively, the server device 304 could return a prioritized listing of the content associated with each incident report entry. Other possible forms of returned data could be used as well.

In addition to the look-up carried out by the server device 304, the new input text string is associated with a new incident report that is entered in the database 902. This is indicated in FIG. 15B as New Entry 1507, having a new unique ID=9244. Also, since the input string "I can't connect to my E-mail" is new among all previous strings (e.g., short descriptions), a new string, "String_M," together with a new unique paragraph vector and unique hash is shown in the list of unique strings 1502. As above, this listing is included here for the purpose of the discussion; there may not necessarily be an actual corresponding data structure implemented, though it there could be.

The examples of FIGS. 15B and 15C are illustrative of the type of search results that may be found using the techniques of example embodiments. However, other types of search procedures could be used, and other types of results found and returned. For example, a search could yield a combination of an exact match and one or more additional similarity matches. Considering again the input string "I can't connect to the network" shown in FIG. 15B, a search could return the same two ID Lists as the search for "I can't connect to my E-mail" shown in FIG. 15C. In this case the first list would include the IDs of the exact hash match, while the second list would include IDs of a similarity match. The prioritization step could then jointly apply similarity and timestamp order in producing the prioritized/sorted list. Various prioritization/sorting algorithms could be applied. For example, priority might always be given first to exact matches, followed by degree of similarity, followed by timestamp order. However, other algorithms could be devised while remaining within the scope and spirit of the present disclosure.

In accordance with example embodiments, the prioritization/sorting step may also include selecting a subset of unique IDs returned from the search. For example, a search may result in 10 unique IDs, however, the prioritization/sorting may select the "top" five of these, where "top" corresponds to best according to the prioritization/sorting criteria. Assuming the prioritization/sorting selects the top N search results, this can be expressed as selecting "up to N" of the search result. This expression account for the case of fewer than N search results.

In accordance with example embodiments, the entries of the look-up set table 1506—i.e., the look-up set data structures—may be kept up-to-date with respect to the recent incident report entries 1504 in the incident report database 902 by applying a sliding time window to the timestamps of the incident reports. An example procedure for such updating is illustrated conceptually in FIG. 15D. The updating procedure uses a "timestamp-to-ID map" data structure that maps a given timestamp to a list of unique IDs of incident report entries that are each associated with the given time stamp. A table of timestamp-to-ID maps, depicted as timestamp-to-ID map table 1508 in FIG. 15D, enables rapid and efficient determination of age and freshness of the incident report records associated with the entries in the look-up set table 1506, relative to a sliding time window. (For the sake of brevity, the list of unique strings 1502 is omitted from FIG. 15D.)

Figure 15D:
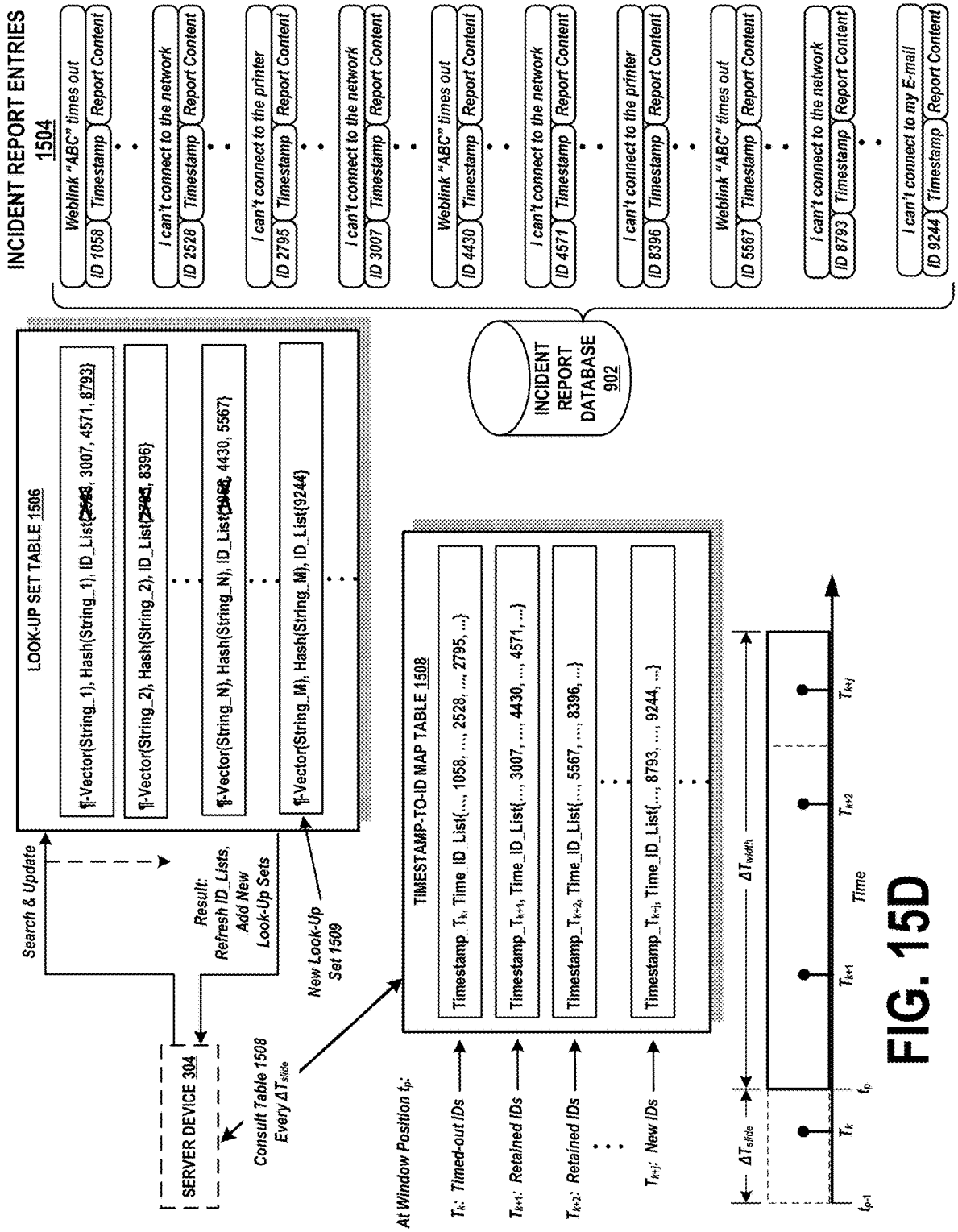
FIG. 15D depicts still a further aspect of operations using the data structures of FIG. 15A, in accordance with example embodiments.

Each timestamp-to-ID map in the table includes a unique timestamp and list of unique IDs of incident report entries that are each associated with the given timestamp. In the illustration of FIG. 15D, the timestamp-to-ID maps have timestamps $T_k$, $T_{k+1}$, $T_{k+2}$, $T_{k+j}$. By way of example, $T_k$ is associated with a list of unique IDs that includes 1058, 2528, and 2795; $T_{k+1}$ is associated with a list of unique IDs that includes 3007, 4430, and 4571; $T_{k+2}$ is associated with a list of unique IDs that includes 5567 and 8396; and $T_{k+j}$ is associated with a list of unique IDs that includes 8793 and 9244.

The bottom left of FIG. 15D shows a portion of a timeline and a sliding time window of width $\Delta T_{width}$. In the illustration, the sliding time window has been moved forward by $\Delta T_{slide}$ from time $t_{p-1}$ to time $t_p$, where the window position is referenced to the lower time edge of the window. The previous position of the sliding time window at $t_p$ is indicated by dashed lines in the timeline illustration. As a result of the forward movement of the sliding time window, the time $T_k$ is now outside the time window, whereas $T_k$ was within the window at its previous position. Times $T_{k+1}$ and $T_{k+2}$ remain within the time window, and were within the time window at its previous position. Time $T_{k+j}$ is newly within the time window, evidently having become a known timestamp value prior to time of movement of the time window to $t_p$.

In accordance with example embodiments, the server device 304 may consult the timestamp-to-ID map table 1508 after a new movement of the sliding time window, and thereby make a determination such as that exemplified just above. The server device 304 may then update the entries of the look-up set table 1506 by correlating the unique IDs in look-up set table entries with the unique IDs in the entries of the timestamp-to-ID map table 1508, taking action based on the associated timestamps with respect to the sliding time window. An example of this operation is indicated to the left of the timestamp-to-ID map table 1508.

Specifically, since $T_k$ is outside the time window, it has timed out. Thus, all associated unique IDs have timed out. For the example shown, these include 1058, 2528, and 2795. Hence, the server may find these unique IDs among the look-up set table 1506, and, if found, delete them from the table entries that contain them. This is indicated by an "X" through each of 1058, 2528, and 2795 where they appear in respective table entries.

Continuing with the example operation, since $T_{k+1}$ and $T_{k+2}$ remain within the time window, the unique ID associated with these timestamps is not yet timed out. In this case, the server retains any of these unique IDs it may find among the unique IDs in the entries in the look-up set table 1506. Thus, the unique IDs 3007, 4430, and 4571, and 5567 and 8396 remain untouched within the entries in the look-up set table 1506.

Continuing further with the example operation, since $T_{k+j}$ is newly within the time window, there may not yet be any entries in the look-up set table 1506 for any of the text strings in incident reports having the unique IDs associated with $T_{k+j}$. Alternatively, there may be an existing entry in the look-up set table 1506, but the new unique ID may be more current than ones already listed for an existing entry. For the current example, this includes unique IDs 8793 and 9244. Thus, in the current example, the server device 304 may discover that unique ID 8793 represent a recently added incident report entry for the existing string "I can't connect to the network" and add 8793 to the ID_List for look-up set entry associated with this string (as indicate by the underlining of 8793 in the list). The unique ID 9244 represents a new incident report entry, as well as a new text string "I can't connect to my E-mail" as shown. Thus, in this case, the server device 304 creates a new look-up set entry 1509 associated with the new text string.

The above procedure may be repeated every $\Delta T_{slide}$ by sliding the window by $\Delta T_{slide}$ and carrying out operations such those illustrated above. In doing so, the look-up set entries may be kept current or fresh. Thus, not only do the example data structures allow for rapid and efficient search of text strings using paragraph vectors, they also provide for rapid and efficient updating of the look-up data, so that the search results may be kept most relevant. Non-limiting example values of $\Delta T_{width}$ and $\Delta T_{slide}$ include 3.0 hours and 0.5 hours, respectively. It will be appreciated that other values could be used.

In further accordance with example embodiments, the maintenance and management of the look-up set table 1506 and the timestamp-to-ID map table 1508 may be carried out centrally or may be distributed among one or more computing devices. Further the tables themselves may be disseminated among various distributed computing devices, such as servers and/or client devices of a remotely managed network. This may allow the distributed devices to carry out searches locally, with no (or at least minimal) access to the database 902. Such an arrangement introduces further speed and efficiency into searches.

IX. EXAMPLE DISTRIBUTED INCIDENT REPORT LOOKUPS

Given that word vector and paragraph vector models of incident reports have a number of advantages over traditional techniques (e.g., contextual accuracy), it is beneficial to deploy these models in a computational instance of a remote network management platform, such as computational instance 322. In this fashion, when a new incident report arrives, similar past incident reports can be readily found.

Given also the potential size of database 902 in a large enterprise (thousands or tens of thousands of incident reports, as noted above), it can be further beneficial to use the data structures and techniques described in the context of FIGS. 14-15D in order to maintain an efficient way of looking up incident reports that are timestamped within a particular window of time.

As an example, suppose there are 90,000 incident reports from the most recent two years in database 902. If a new incident report arrives indicating that a user cannot connect to his or her email server, it may be advantageous to at least initially search a limited number of recently opened and/or closed incident reports to find similar problem descriptions. This reflects the observation that IT issues that affect one user will typically impact other users as well, perhaps in a similar way and perhaps having the same or a similar solution. Thus, if the time window defines some limited period of time (e.g., the most recent 1 day, 3 days, 7 days, etc.), the resulting search will focus on incident reports within this time window that are similar to the new incident report. In this way, the likelihood that the new incident report can be rapidly and accurately addressed increases.

Still, with the scale of a large enterprise (e.g., thousands or tens of thousands of employees or more) and the potential size of database 902, there may be a need to support multiple queries into database 902 in parallel. Even with the efficiencies afforded by the data structures and techniques described in the context of FIGS. 14-15D, these searches might still require non-trivial processing and memory resources to carry out. In particular, any lookups that require use of the encoders described in the context of FIG. 11C (including encoders that produce paragraph vectors) can produce additional computational and memory load.

As discussed above, a computational instance may include one or more server devices and one or more database devices. But these server and database devices facilitate some or all activities that involve the computational instance. Thus, one way in which a computational instance can be partitioned is into user interface (UI) nodes, worker nodes, and database nodes. Each of these "nodes" may be a physical or virtual server.

The UI nodes generate and provide GUI representations for client devices accessing the computational instance by way of (for example) web protocols. Thus, the UI nodes may receive requests from the client devices, determine how these requests are to be processed, and distribute one or more tasks to the worker nodes. The worker nodes carry out these tasks, which may include doing lookups by way of the database nodes to obtain the requested information. The worker nodes may then process the obtained information to place it in a form usable by the UI nodes, and the UI nodes may organize this information into one or more GUI representations that are transmitted to the client devices. The computational instance may be handling dozens of these procedures in parallel. The worker nodes may also carry out other scheduled or background tasks, such as periodic updates to the information available by way of the database nodes, downloading information to the computational instance and so on (e.g., discovery procedures).

Since UI and worker nodes are already resource constrained, not to mention that it is desirable to maintain a responsive UI for users, it may not be ideal to add machine learning (ML) tasks to these nodes. Accordingly, dedicated ML worker nodes may be added to a computational instance.

Figure 16:
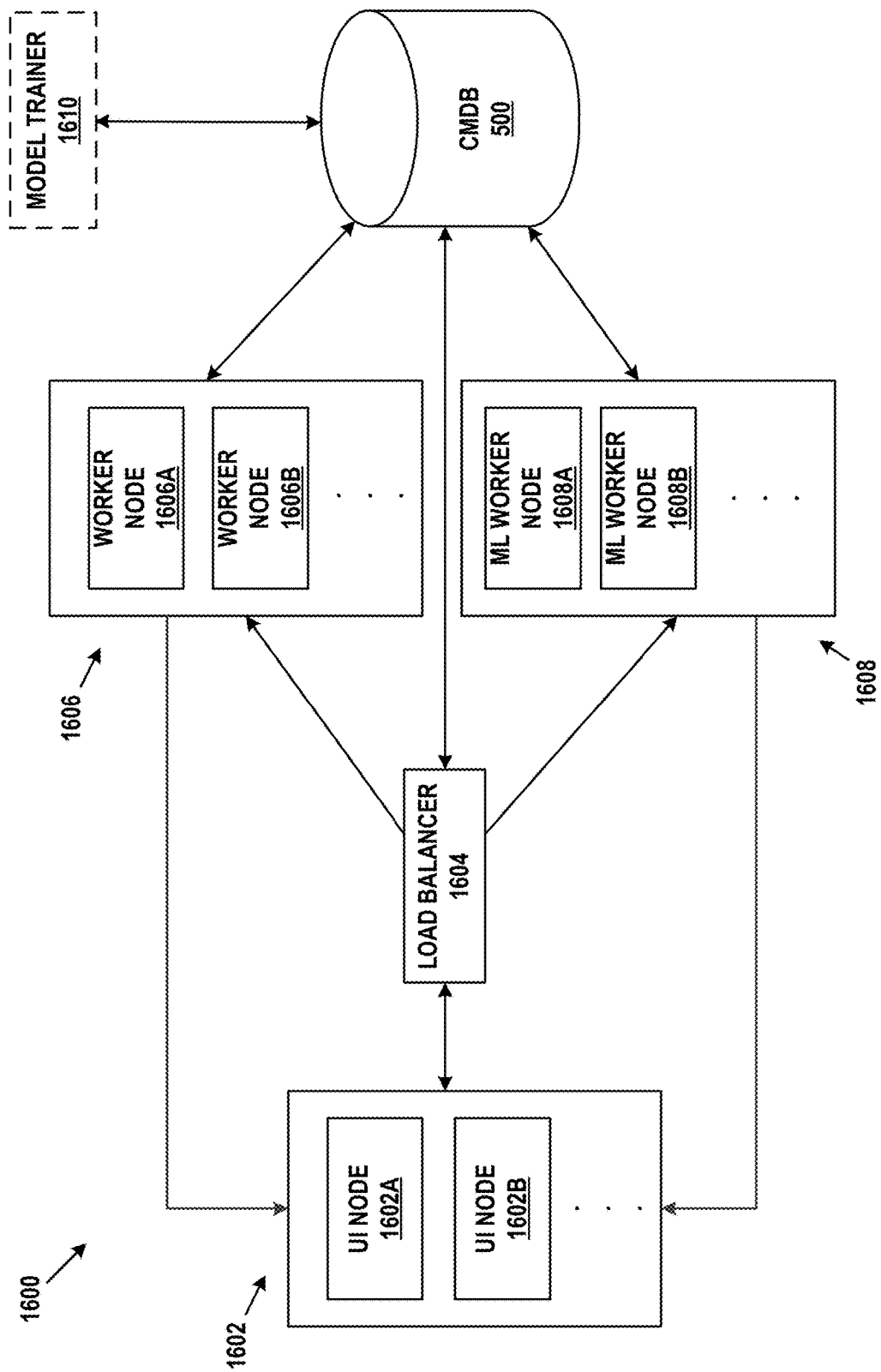
FIG. 16 depicts a computational instance that supports various types of worker nodes, in accordance with example embodiments.

Such an arrangement is illustrated in FIG. 16. Example computational instance 1600 contains UI nodes 1602 (including UI node 1602A, UI node 1602B, and so on) load balancer 1604, worker nodes 1606 (including worker node 1606A, worker node 1606B, and so on), ML worker nodes 1608 (including ML worker node 1608A, ML worker node 1608B, and so on), and CMDB 500.

UI nodes 1602 may be configured to receive requests for web pages from client devices and to serve these web pages to the client devices. In some situations, UI nodes 1602 may route such a request through load balancer 1604. Load balancer 1604 may, in turn, route the request directly to CMDB 500 (or another database), or may select one or more worker nodes 1606 or ML worker nodes 1608 to assist with fulfilling the request. Load balancer 1604 may make this selection so that the requests assigned to worker nodes 1606 is roughly balanced amongst worker nodes 1606 and the requests assigned to ML worker nodes 1608 is roughly balanced amongst ML worker nodes 1608. As examples, a round-robin or random selection may be made.

Worker nodes 1606 (including worker node 1606A, worker node 1606B, and so on) may be configured to offload some of the computational load for non-ML tasks from UI nodes 1602. Similarly ML worker nodes 1608 (including ML worker node 1608A, ML worker node 1608B, and so on) may be configured to offload some of the computational load for ML tasks from UI nodes 1602. Within a worker node cluster (e.g., worker nodes 1606 or ML worker nodes 1608) each individual worker node may be configured similarly and operate largely independently of one another. For example, ML worker nodes 1608 may all be uniformly configured with the same hardware and software configuration, aside from certain parameters (such as IP addresses and network interface card addresses) that might need to be different amongst nodes.

Further, each of worker nodes 1606 and ML worker nodes 1608 may be pre-configured with or able to generate some number of worker threads (e.g., threads of execution, sometimes referred to as processes or programs) that are assigned to carry out discrete requests. Thus, for example, a thread executing on worker node 1606B may be assigned a request from one of UI nodes 1602, and then may access the requested information in CMDB 500, formulate a reply, and provide this reply to the requesting UI node. In another example, a thread executing on ML worker node 1608A may be assigned a request that involves use of an ML model, and then may retrieve or access the ML model by way of CMDB 500 or another database, execute the ML model in accordance with the request, and provide a reply to the requesting UI node. In this fashion, any particular ML model may be used by one or more threads on one or more worker nodes at any given time.

Computational instance 1600 may also have access to model trainer 1610. In some embodiments (and as indicated by dotted lines), model trainer 1610 may be a shared service used by multiple computational instances, or may be dedicated to computational instance 1600. Model trainer 1610 may be configured to train a new ML model or update an existing ML model to reflect new data. For instance, an ML model incorporating word vectors and/or paragraph vectors used to find similar incident reports may be re-trained periodically (e.g., once a week or once a month) to incorporate incident reports received since the ML model was previously trained.

Since training an ML model is expected to be computationally expensive, the training may take place in a central computational instance in order to reduce the load on computational instance 1600. But this does not rule out the training being performed by computational instance 1600. Regardless, once an ML model is trained, it may be deployed to CMDB 500 or another database within computational instance 1600. Then, when the ML model is to be used by one of ML worker nodes 1608, that ML worker node can retrieve the ML model from the database and carry out the appropriate ML task.

But as noted above, one of the advantages of the embodiments herein is the use of a look-up set, such as the example of look-up set table 1506. In addition to return relevant and recent results, such a look-up set allows efficient access to an ML model. In some cases, use of a look-up set reduces the frequency at which the ML model needs to be used, thereby reducing computational load. In order to make the look-up set available to ML worker nodes, the look-up set may also be stored in CMDB 500 or another database.

In particular, when an ML model for incident reports is trained, it may contain the word vectors and other information used to compute the paragraph vector for a set of text fields in the reports. This ML model is used to calculate paragraph vectors for the initial look-up set as specified by the relevant time window and possibly other constraints as well. The particular calculation may be done at training time to seed the initial look-up set, and the results may be placed in an initial look-up set table, of which look-up set table 1506 is an example. Both the ML model and the initial look-up set table are provided to and stored in CMDB 500 (or another database). This database then provides the ML model and the initial look-up set table to the ML worker nodes. Herein, an "initial" look-up set is the first look-up set generated after an ML model is trained or re-trained.

FIG. 17A illustrates an example arrangement containing ML worker nodes 1608, model trainer 1610, and CMDB 500. Model trainer 1610 trains ML model 1702 and calculates look-up set table 1704. Model trainer 1610 then provides ML model 1702 and look-up set table 1704 to CMDB 500. CMDB 500 distributes ML model 1702 and look-up set table 1704 to ML worker nodes 1608A, 1608B, and 1608C. Note that newly-introduced ML worker node 1608C is shown executing update thread 1706 for updating look-up set table 1704. But, in full generality, one or more update threads can be executing on any one or more of ML worker nodes 1608.

Figure 17B:
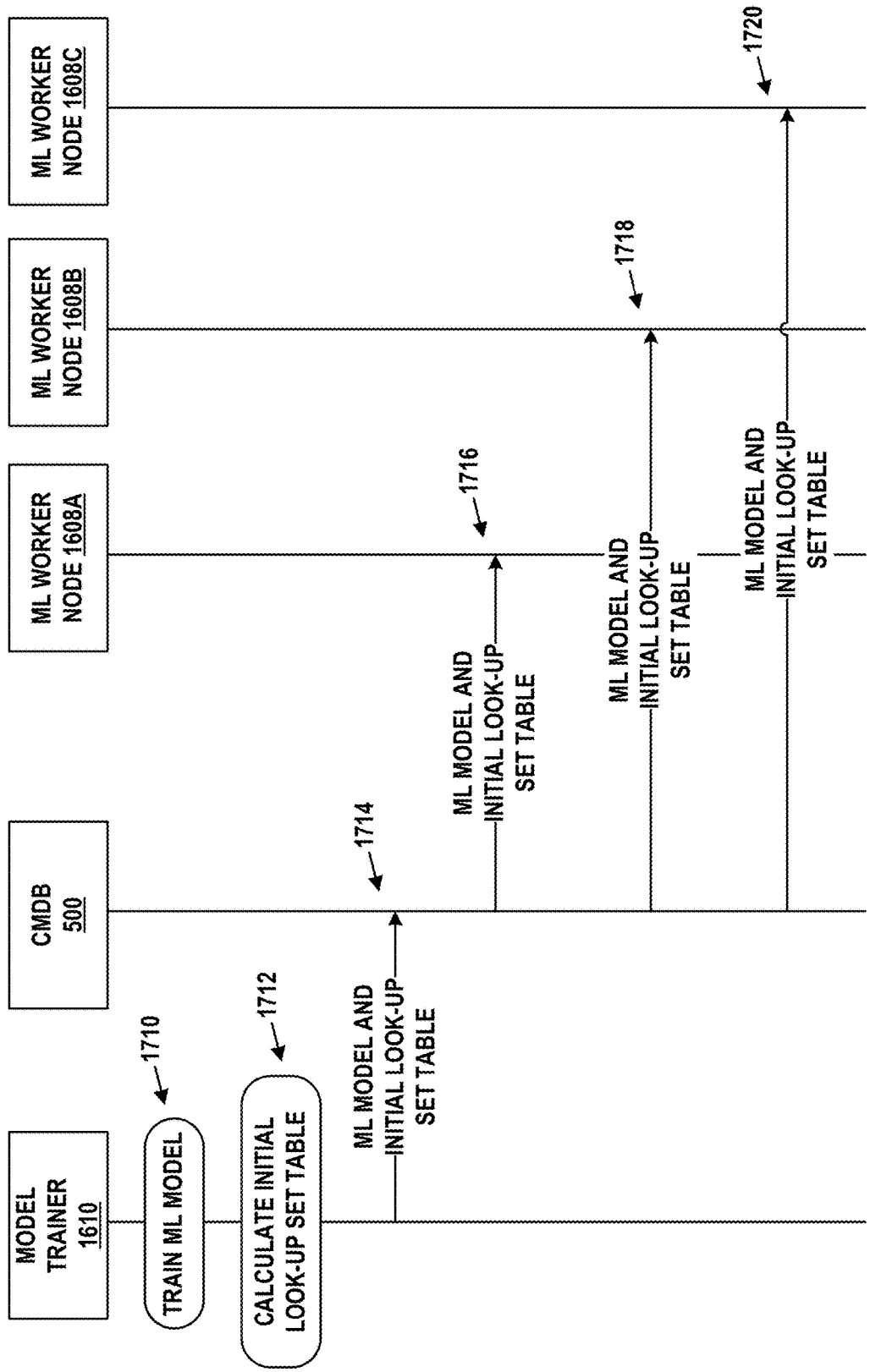
FIG. 17B is a message flow diagram, in accordance with example embodiments.

FIG. 17B illustrates the training of an ML model, calculation of a look-up set table, and distribution of both to a CMDB and related ML worker nodes. At step 1710, model trainer 1610 trains an ML model. At step 1712, model trainer 1610 calculates the initial look-up set table. In some embodiments, this calculation may be performed by another device, such as one of ML worker nodes 1608A, 1608B, or 1608C. Assuming for the moment that the initial look-up set table is calculated by model trainer 1610, then at step 1714 model trainer 1610 may transmit the ML model and the initial look-up set table to CMDB 500. At steps 1716, 1718, and 1720, respectively, CMDB 500 may transmit the ML model and the initial look-up set table to each of ML worker nodes 1608A, 1608B, and 1608C.

With the ML model and initial look-up set table in place, computational instance 1600 can begin predicting similarities between incident reports. When a newly opened incident report is being reviewed, a user may request a list of similar past incident reports (alternatively, computational instance 1600 may automatically determine such a list upon or after arrival of the newly opened incident report). Particularly, one of ML worker nodes 1608A, 1608B, or 1608C can be assigned the tasks of calculating a paragraph vector for the newly opened incident report using the ML model, and finding similar incident reports referenced by the look-up set table. The procedures discussed in the context of FIGS. 14-15D may be used for this purpose, for example.

As time moves forward, any further newly arriving incident reports are collected and marked as to be used for updating the lookup set. When the initial (or any subsequent) look-up set expires, this look-up set is updated by update thread 1706. For instance, update thread 1706 may be configured to execute an update every 15 minutes, 30 minutes, 60 minutes, 240 minutes, etc. The updating may involve the following steps: (1) using ML model 1702 in CMDB 500 or the local worker node to compute paragraph vectors for each of the stored incident reports that are to be added to the look-up set, (2) adding these paragraph vectors the look-up set, (3) removing the paragraph vectors for older incident reports that are no longer within the time window of the look-up set, (4) providing the updated look-up set to the CMDB, and (5) signaling each of the worker nodes to retrieve and use the updated look-up set. By distributing the updated look-up set to all of the ML worker nodes in a timely fashion, the ML worker nodes are able to use the most current version of the look-up set table when calculating incident report similarities. Doing so is expected to provide more accurate results.

Figure 17C:
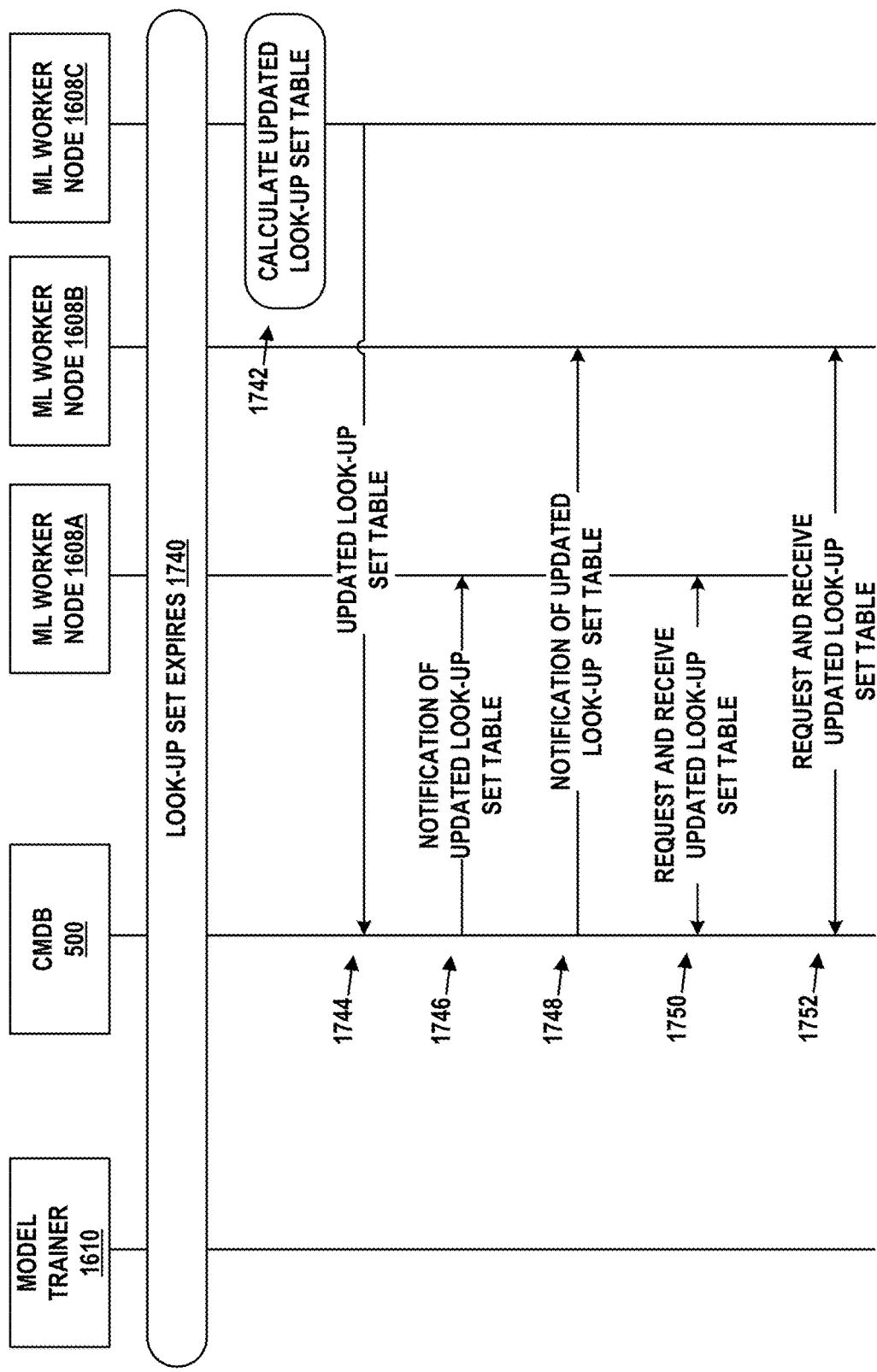
FIG. 17C is a message flow diagram, in accordance with example embodiments.

This procedure is illustrated by FIG. 17C. At step 1740, the current look-up set expires. At step 1742, ML worker node 1608C executes update thread 1706 to calculate the updated look-up set table. At step 1744, ML worker node 1608C provides the updated look-up set table to CMDB 500. At steps 1746 and 1748, respectively, CMDB 500 notifies ML worker node 1608A and ML worker node 1608B of the updated look-up set table. At step 1750, in response to receiving the notification, ML worker node 1608A requests and retrieves the updated look-up set table. At step 1752, also in response to receiving the notification, ML worker node 1608B requests and retrieves the updated look-up set table. Then, ML worker nodes 1608A, 1608B, and 1608C process new incident report similarity calculations using the updated look-up set table. In some embodiments, the updates may occur in a stateless fashion, and CMDB 500 might not record which of the worker nodes provided the updated look-up set table. In such a situation, CMDB 500 may also notify ML worker node 1608C of the updated look-up set table. In alternative embodiments, ML worker node 1608C may notify ML worker node 1608A and ML worker node 1608B of the updated look-up set table.

X. EXAMPLE OPERATIONS

FIG. 18 is a flow chart illustrating an example embodiment. The process illustrated by FIG. 18 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 18 may be simplified by the removal of any one or more of the features shown therein. Further, these embodiments may be combined with features, aspects, and/or implementations of any of the previous figures or otherwise described herein.

Block 1800 may involve determining, by an update thread executing on a computing device, that a look-up set table has expired, where the look-up set table is related to an ML model trained to calculate paragraph vectors of incident reports, where the paragraph vectors map one or more text fields of the incident reports into a semantically encoded vector space, where the look-up set table contains a list of paragraph vectors and respective associations between each paragraph vector in the list and sets of the incident reports, and where the incident reports referenced by the look-up set table each contain a timestamp that is within a sliding time window of a pre-determined length.

Block 1802 may involve updating, by the update thread, the look-up set table by: (i) adding a first set of incident reports received since a most recent update of the look-up set table, and (ii) removing a second set of incident reports containing timestamps that are no longer within the sliding time window.

Block 1804 may involve storing, by the update thread and in a database, the look-up set table as updated.

Block 1806 may involve transmitting, by the update thread and to one or more ML worker nodes, respective indications that the look-up set table has been updated, where reception of the respective indications causes the ML worker nodes that were notified to retrieve, from the database, the look-up set table as updated.

In some embodiments, each of the plurality of ML worker nodes stores the ML model.

In some embodiments, determining that the look-up set table has expired comprises determining that a periodic timer associated with the look-up set table has fired. In some embodiments, the sliding time window is longer than a period of the periodic timer.

In some embodiments, the update thread is executed by a particular ML worker node. Transmitting, to the ML worker nodes, respective indications that the look-up set table has been updated may involve transmitting, to all of the ML worker nodes except for the particular ML worker node, respective indications that the look-up set table has been updated.

In some embodiments, each of the ML worker nodes is a physically distinct computing device.

In some embodiments, the timestamps record when the incident reports were opened. In other embodiments, the timestamps record when the incident reports were closed.

In some embodiments, the ML worker nodes are further configured to: (i) receive new incident reports, (ii) calculate respective paragraph vectors of the new incident reports, and (iii) use the look-up set table as updated to determine similarities between the respective paragraph vectors of the new incident reports and the list of paragraph vectors.

XI. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a database containing a corpus of incident reports, a machine learning (ML) model trained to calculate paragraph vectors of the incident reports, and a look-up set table related to the ML model, wherein the paragraph vectors map one or more text fields of the incident reports into a semantically encoded vector space, wherein the look-up set table contains a list of paragraph vectors and respective associations between each paragraph vector in the list and sets of the incident reports, wherein each paragraph vector in the look-up set table is unique and is associated with a set of incident report IDs identifying incident reports that contain the text field for which the paragraph vector has been calculated, and wherein the incident reports referenced by the look-up set table each contain a timestamp that is within a sliding time window of a pre-determined length;

a plurality of ML worker nodes, each storing the look-up set table and configured to execute the ML model to calculate a paragraph vector for a text field of a new incident report, and look for paragraph vectors in the look-up set table that are similar to the paragraph vector for the text field of the new incident report; and program instructions that, when executed, are configured to cause an update thread to perform operations including:

determining that the look-up set table has expired;

updating the look-up set table by: (i) adding a first set of incident report IDs for incident reports received since a most recent update of the look-up set table, and (ii) removing a second set of incident report IDs for incident reports containing timestamps that are no longer within the sliding time window;

storing, in the database, the look-up set table as updated; and transmitting, to one or more of the plurality of ML worker nodes, respective indications that the look-up set table has been updated, wherein reception of the respective indications causes the one or more ML worker nodes that were notified to retrieve, from the database, the look-up set table as updated.

2. The system of claim 1, wherein each of the plurality of ML worker nodes stores the ML model.

3. The system of claim 1, wherein determining that the look-up set table has expired comprises determining that a periodic timer associated with the look-up set table has fired.

4. The system of claim 3, wherein the sliding time window is longer than a period of the periodic timer.

5. The system of claim 1, wherein the program instructions are stored within a particular ML worker node of the plurality of ML worker nodes, wherein the update thread is executed by the particular ML worker node, and wherein transmitting, to the one or more ML worker nodes, the respective indications that the look-up set table has been updated comprises:

transmitting, to all of the plurality of ML worker nodes except for the particular ML worker node, the respective indications that the look-up set table has been updated.

6. The system of claim 1, wherein each of the plurality of ML worker nodes is a physically distinct computing device.

7. The system of claim 1, wherein the timestamps record when the incident reports were opened.

8. The system of claim 1, wherein the timestamps record when the incident reports were closed.

9. The system of claim 1, wherein the plurality of ML worker nodes is further configured to:

receive new incident reports;

calculate respective paragraph vectors of the new incident reports; and use the look-up set table as updated to determine similarities between the respective paragraph vectors of the new incident reports and the list of paragraph vectors.

10. A computer-implemented method comprising:

determining, by an update thread executing on a computing device, that a look-up set table has expired, wherein the look-up set table is related to a machine learning (ML) model trained to calculate paragraph vectors of incident reports, wherein the paragraph vectors map one or more text fields of the incident reports into a semantically encoded vector space, wherein the look-up set table contains a list of paragraph vectors and respective associations between each paragraph vector in the list and sets of the incident reports, wherein each paragraph vector in the look-up set table is unique and is associated with a set of incident report IDs identifying incident reports that contain the text field for which the paragraph vector has been calculated, wherein the incident reports referenced by the look-up set table each contain a timestamp that is within a sliding time window of a pre-determined length, and wherein the look-up set table is stored by each of a plurality of ML worker nodes, each being configured to calculate a paragraph vector for a text field of a new incident report using the ML model and to look for paragraph vectors in the look-up set table that are similar to the paragraph vector for the text field of the new incident report;

updating, by the update thread, the look-up set table by: (i) adding a first set of incident report IDs for incident reports received since a most recent update of the look-up set table, and (ii) removing a second set of incident report IDs for incident reports containing timestamps that are no longer within the sliding time window;

storing, by the update thread and in a database, the look-up set table as updated; and transmitting, by the update thread and to one or more of the plurality of one or more ML worker nodes, respective indications that the look-up set table has been updated, wherein reception of the respective indications causes the one or more ML worker nodes that were notified to retrieve, from the database, the look-up set table as updated.

11. The computer-implemented method of claim 10, wherein each of the plurality of ML worker nodes stores the ML model.

12. The computer-implemented method of claim 10, wherein determining that the look-up set table has expired comprises determining that a periodic timer associated with the look-up set table has fired.

13. The computer-implemented method of claim 12, wherein the sliding time window is longer than a period of the periodic timer.

14. The computer-implemented method of claim 10, wherein the update thread is executed by a particular ML worker node of the plurality of ML worker nodes, and wherein transmitting, to the one or more ML worker nodes, the respective indications that the look-up set table has been updated comprises:

transmitting, to all of the plurality of ML worker nodes except for the particular ML worker node, the respective indications that the look-up set table has been updated.

15. The computer-implemented method of claim 10, wherein the timestamps record when the incident reports were opened.

16. The computer-implemented method of claim 10, wherein the timestamps record when the incident reports were closed.

17. An article of manufacture including a non-transitory computer-readable medium, having stored thereon program instructions that, upon execution by a computing system, cause the computing system to perform operations comprising:

determining, by an update thread executing on the computing system, that a look-up set table has expired, wherein the look-up set table is related to a machine learning (ML) model trained to calculate paragraph vectors of incident reports, wherein the paragraph vectors map one or more text fields of the incident reports into a semantically encoded vector space, wherein the look-up set table contains a list of paragraph vectors and respective associations between each paragraph vector in the list and sets of the incident reports, wherein each paragraph vector in the look-up set table is unique and is associated with a set of incident report IDs identifying incident reports that contain the text field for which the paragraph vector has been calculated, wherein the incident reports referenced by the look-up set table each contain a timestamp that is within a sliding time window of a pre-determined length, and wherein the look-up set table is stored by each of a plurality of ML worker nodes, each being configured to calculate a paragraph vector for a text field of a new incident report using the ML model and to look for paragraph vectors in the look-up set table that are similar to the paragraph vector for the text field of the new incident report;

updating, by the update thread, the look-up set table by: (i) adding a first set of incident report IDs for incident reports received since a most recent update of the look-up set table, and (ii) removing a second set of incident report IDs for incident reports containing timestamps that are no longer within the sliding time window;

storing, by the update thread and in a database, the look-up set table as updated; and transmitting, by the update thread and to one or more of the plurality of ML worker nodes, respective indications that the look-up set table has been updated, wherein reception of the respective indications causes the one or more ML worker nodes that were notified to retrieve, from the database, the look-up set table as updated.

18. The article of manufacture of claim 17, wherein determining that the look-up set table has expired comprises determining that a periodic timer associated with the look-up set table has fired.

19. The article of manufacture of claim 18, wherein the sliding time window is longer than a period of the periodic timer.

20. The article of manufacture of claim 17, wherein the program instructions are stored within a particular ML worker node of the plurality of ML worker nodes, wherein the update thread is executed by the particular ML worker node, and wherein transmitting, to the one or more ML worker nodes, the respective indications that the look-up set table has been updated comprises:

transmitting, to all of the plurality of ML worker nodes except for the particular ML worker node, the respective indications that the look-up set table has been updated.

* * * * *